United States Patent
Kunishige et al.

(10) Patent No.: US 10,542,215 B2
(45) Date of Patent: Jan. 21, 2020

(54) INSTRUMENT, CONTROL METHOD, AND COMPUTER READABLE RECORDING MEDIUM

(71) Applicant: Olympus Corporation, Hachioji-shi, Tokyo (JP)

(72) Inventors: Keiji Kunishige, Hachioji (JP); Masashi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/210,903

(22) Filed: Dec. 5, 2018

(65) Prior Publication Data
US 2019/0191086 A1    Jun. 20, 2019

(30) Foreign Application Priority Data
Dec. 14, 2017    (JP) .................. 2017-239835

(51) Int. Cl.
*H04N 5/232* (2006.01)
*G06F 3/0484* (2013.01)
*H04N 1/00* (2006.01)
*G06F 3/0482* (2013.01)

(52) U.S. Cl.
CPC ....... *H04N 5/23245* (2013.01); *G06F 3/0482* (2013.01); *G06F 3/04847* (2013.01); *H04N 1/0097* (2013.01); *H04N 5/23216* (2013.01); *H04N 5/23225* (2013.01); *H04N 5/232933* (2018.08); *H04N 5/232939* (2018.08)

(58) Field of Classification Search
CPC ............. H04N 1/00503; H04N 1/0097; H04N 5/23216; H04N 5/23225; H04N 5/23245; H04N 5/232933; H04N 5/232939
See application file for complete search history.

(56) References Cited

U.S. PATENT DOCUMENTS

| | | | | |
|---|---|---|---|---|
| 2008/0240694 | A1* | 10/2008 | Okazaki | G03B 17/18 396/50 |
| 2008/0284856 | A1* | 11/2008 | Okazaki | G03B 17/18 348/207.99 |
| 2016/0077687 | A1* | 3/2016 | Watanabe | H04N 1/0035 715/763 |

(Continued)

FOREIGN PATENT DOCUMENTS

JP    2012-029056    2/2012

*Primary Examiner* — Daniel M Pasiewicz
(74) *Attorney, Agent, or Firm* — John C. Pokotylo; Pokotylo Patent Services

(57) ABSTRACT

An instrument executes: generating pieces of setting information for assigning operation functions to respective operating units; assigning the operation functions to the respective operating units based on first one of the pieces of setting information; setting one of the operating units as a setting operating unit to which an operation function for switching the first one of the pieces of setting information to second one of the pieces of the setting information assigned to the setting operating unit is assigned; changing, upon a first operation of the setting operating unit, the operation functions of the operating units based on the second one of the setting information and inhibiting a change in the operation function assigned to the setting operating unit; and returning, upon a second operation of the setting operating unit after the first operation, the operation functions of the operating units to those assigned before the first operation.

11 Claims, 20 Drawing Sheets

(56) References Cited

U.S. PATENT DOCUMENTS

2016/0191800 A1\* 6/2016 Yoshikawa ........ H04N 5/23293
  348/220.1
2018/0152626 A1\* 5/2018 Matsuoka .......... H04N 5/23216
2018/0198988 A1\* 7/2018 Suo ........................ G03B 7/091

\* cited by examiner

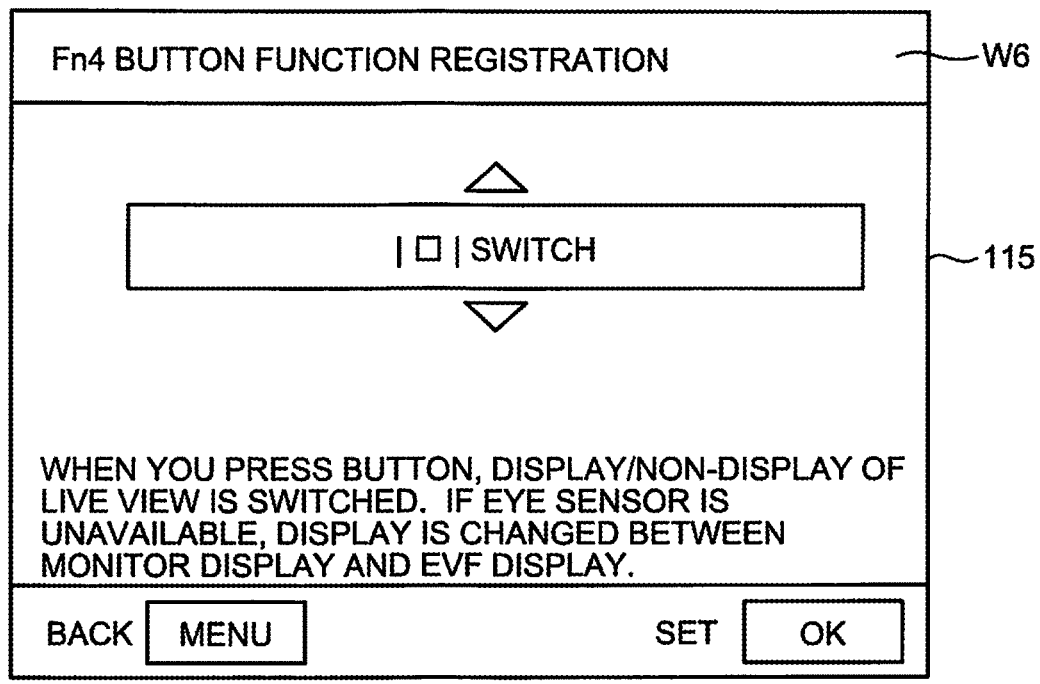

FIG.11

| | |
|---|---|
| OFF | T2 |
| AF STOP | |
| AEL | |
| PREVIEW | |
| ONE-TOUCH WB | |
| AF TARGET SELECTION ([...] SELECTION) | |
| AF-HOME ([...]HOME) | |
| MF SWITCH | |
| RAW SWITCH | |
| TEST-SHOT FUNCTION | |
| UNDERWATER WIDE/MACRO | |
| EXPOSURE COMPENSATION | |
| DIGITAL TELECONVERTER | |
| MOVIE TELECONVERTER | |
| 🔍 ENLARGE | |
| DIGITAL SHIFT SHOOTING | |
| HDR SHOOTING | |
| BKT SWITCHING | |
| F DIAL ISO/R DIAL WB | |
| F DIAL WB/R DIAL ISO | |
| MULTIPLE Fn | |
| PEAKING | |
| DISPLAY OM VIEWFINDER LEVEL | |
| | □ | SWITCH | |
| MySet (MySet SHOOTING 1 TO 4) | |
| MySet1 | |
| MySet2 | |
| MySet3 | |
| MySet4 | |
| OVF SIMULATION | |
| AF LIMITER | |
| PRESET MF | |
| CAMERA SHAKE COMPENSATION | |
| ●MOVING IMAGE SHOOTING (START/STOP) | |
| FLASH | |
| DRIVE | |
| TOUCH LOCK | |
| POWER ZOOM | |
| S-AF (+MF); SET POSITION TO TARGET MODE | |
| C-AF; SET POSITION TO TARGET MODE | |
| C-AF+Tr; SET POSITION TO TARGET MODE | |
| OPTICAL MEASUREMENT MODE | |
| SYNCHRONIZED SCANNING | |
| LV BOOST OFF | |
| SWITCH AF TARGET MODE | |
| WB-Lock | |
| SYNCHRONIZED SCANNING | |
| FISHEYE CORRECTION | |

FIG.19

| | BASE SET VALUE | MYSET REGISTRATION VALUE | | | |
|---|---|---|---|---|---|
| | | MySet1 | MySet2 | MySet3 | MySet4 |
| Fn1 BUTTON | MySet | |□|SWITCH (MONITOR/ EVF SWITCH) [A] $X_A$ | RAW SWITCH $X_A$ | TEST-SHOT FUNCTION $X_A$ | UNDERWATER WIDE/MACRO $X_A$ |
| Fn2 BUTTON | AEL | OVF SIMULATION | CAMERA SHAKE COMPENSA- TION | AF LIMITER | PRESET MF |
| Fn3 BUTTON | Q (ENLARGE) | OPTICAL MEASURE- MENT MODE | SYNCHRO- NIZED SCANNING | LV BOOST OFF | SWITCH AF TARGET MODE |
| Fn4 BUTTON | |□|SWITCH (MONITOR/ EVF SWITCH) | WB-Lock [B] | PRESET MF | Myset1 $X_B$ | EXPOSURE COMPENSA- TION |
| ●MOVING IMAGE BUTTON | ●MOVING IMAGE SHOOTING (START/STOP) | DIGITAL TELECON- VERTER [B] | MOVIE TELECON- VERTER | MySet2 $X_B$ | HDR SHOOTING |
| CROSS BUT- TON (UP) | AF TARGET MOVEMENT | EXPOSURE COMPENSA- TION | F DIAL ISO/ R DIAL WB | DIGITAL SHIFT SHOOTING | AF TARGET MOVEMENT |
| CROSS BUT- TON (DOWN) | AF TARGET MOVEMENT | DRIVE | DRIVE | DRIVE | AF TARGET MOVEMENT |
| CROSS BUT- TON (LEFT) | AF TARGET MOVEMENT | SWITCH AF TARGET MODE | SWITCH AF TARGET MODE | SWITCH AF TARGET MODE | AF TARGET MOVEMENT |
| CROSS BUT- TON (RIGHT) | AF TARGET MOVEMENT | FLASH | FLASH | FLASH | AF TARGET MOVEMENT |
| Fn LEVER | MODE 1 (2×2 DIAL) | MODE 2 (AF SETTING SWITCH) [C] $X_C$ | MODE 3 (STILL/ MOVING IM- AGE SWITCH) $X_C$ | PW1 $X_C$ | PW2 $X_C$ |
| F DIAL | DIAL FUNCTION IN PASM MODE [D] | DIAL FUNC- TION 1 IN PASM MODE $X_D$ | DIAL FUNC- TION 2 IN PASM MODE $X_D$ | DIAL FUNC- TION 3 IN PASM MODE $X_D$ | DIAL FUNC- TION 4 IN PASM MODE $X_D$ |
| R DIAL | DIAL FUNCTION IN PASM MODE [D] | DIAL FUNC- TION 1 IN PASM MODE $X_D$ | DIAL FUNC- TION 2 IN PASM MODE $X_D$ | DIAL FUNC- TION 3 IN PASM MODE $X_D$ | DIAL FUNC- TION 4 IN PASM MODE $X_D$ |

FIG.20

| | BASE SET VALUE | MYSET REGISTRATION VALUE | | | |
|---|---|---|---|---|---|
| | | MySet1 | MySet2 | MySet3 | MySet4 |
| Fn1 BUTTON | MySet | |□|SWITCH (MONITOR/ EVF SWITCH) | RAW SWITCH | TEST-SHOT FUNCTION | UNDERWATER WIDE/MACRO |
| Fn2 BUTTON | AEL | MySet | CAMERA SHAKE COMPENSATION [A] $X_A$ | AF LIMITER $X_A$ | PRESET MF $X_A$ |
| Fn3 BUTTON | Q (ENLARGE) | OPTICAL MEASUREMENT MODE | SYNCHRONIZED SCANNING | LV BOOST OFF | SWITCH AF TARGET MODE |
| Fn4 BUTTON | |□|SWITCH (MONITOR/ EVF SWITCH) | WB-Lock | PRESET MF [B] | Myset1 $X_B$ | EXPOSURE COMPENSATION |
| ●MOVING IMAGE BUTTON | ●MOVING IMAGE SHOOTING (START/STOP) | DIGITAL TELECONVERTER | MOVIE TELECONVERTER [B] | MySet2 $X_B$ | HDR SHOOTING |
| CROSS BUTTON (UP) | AF TARGET MOVEMENT | EXPOSURE COMPENSATION | F DIAL ISO/ R DIAL WB | DIGITAL SHIFT SHOOTING | AF TARGET MOVEMENT |
| CROSS BUTTON (DOWN) | AF TARGET MOVEMENT | DRIVE | DRIVE | DRIVE | AF TARGET MOVEMENT |
| CROSS BUTTON (LEFT) | AF TARGET MOVEMENT | SWITCH AF TARGET MODE | SWITCH AF TARGET MODE | SWITCH AF TARGET MODE | AF TARGET MOVEMENT |
| CROSS BUTTON (RIGHT) | AF TARGET MOVEMENT | FLASH | FLASH | FLASH | AF TARGET MOVEMENT |
| Fn LEVER | MODE 1 (2×2 DIAL) | MODE 2 (AF SETTING SWITCH) [C] | MODE 3 (STILL/ MOVING IMAGE SWITCH) $X_C$ | PW1 $X_C$ | PW2 $X_C$ |
| F DIAL | DIAL FUNCTION IN PASM MODE | DIAL FUNCTION 1 IN PASM MODE [D] | DIAL FUNCTION 2 IN PASM MODE $X_D$ | DIAL FUNCTION 3 IN PASM MODE $X_D$ | DIAL FUNCTION 4 IN PASM MODE $X_D$ |
| R DIAL | DIAL FUNCTION IN PASM MODE | DIAL FUNCTION 1 IN PASM MODE [D] | DIAL FUNCTION 2 IN PASM MODE $X_D$ | DIAL FUNCTION 3 IN PASM MODE $X_D$ | DIAL FUNCTION 4 IN PASM MODE $X_D$ |

INSTRUMENT, CONTROL METHOD, AND COMPUTER READABLE RECORDING MEDIUM

CROSS-REFERENCE TO RELATED APPLICATION

This application is based upon and claims the benefit of priority from Japanese Patent Application No. 2017-239835, filed on Dec. 14, 2017, the entire contents of which are incorporated herein by reference.

BACKGROUND

The present disclosure relates to an instrument, a control method, and a computer readable recording medium.

In the related art, there is a known technology for providing instruments, such as digital cameras, each of which may perform a custom mode in which a customization function for arbitrarily assigning various operation functions to operating units, such as specific buttons or dials, or a specific function, for example, a capturing condition (shutter speed, diaphragm value, and sensitivity) is set to a desired set value (for example, Japanese Laid-open Patent Publication No. 2012-29056). In this technology, by allowing the function of an operation member changed in the custom mode by a change unit to be available only at the time of shooting that is performed when the function was changed.

SUMMARY

An instrument according to one aspect of the present disclosure includes a processor including hardware, the processor being configured to execute: generating pieces of setting information for assigning operation functions to respective operating units configured to be operated by a user; assigning the operation functions to the respective operating units based on first one of the pieces of setting information; setting one of the operating units as a setting operating unit to which an operation function for switching the first one of the pieces of setting information to second one of the pieces of the setting information assigned to the setting operating unit is assigned; changing, upon a first operation of the setting operating unit, the operation functions of the operating units based on the second one of the setting information and inhibiting a change in the operation function assigned to the setting operating unit; and returning, upon a second operation of the setting operating unit after the first operation of the setting operating unit, the operation functions of the operating units to the operation functions assigned before the first operation of the setting operating unit.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 10 is a diagram schematically illustrating an outline of a method for setting the setting information performed by a user;

FIG. 11 is a diagram schematically illustrating an outline of a method for setting the setting information performed by a user;

FIG. 19 is a diagram illustrating an outline of the automatic generation process of a myset inhibition function registration list illustrated in FIG. 18;

FIG. 20 is a diagram illustrating an outline of the automatic generation process of a myset inhibition function registration list illustrated in FIG. 18;

DETAILED DESCRIPTION

Figure 1:
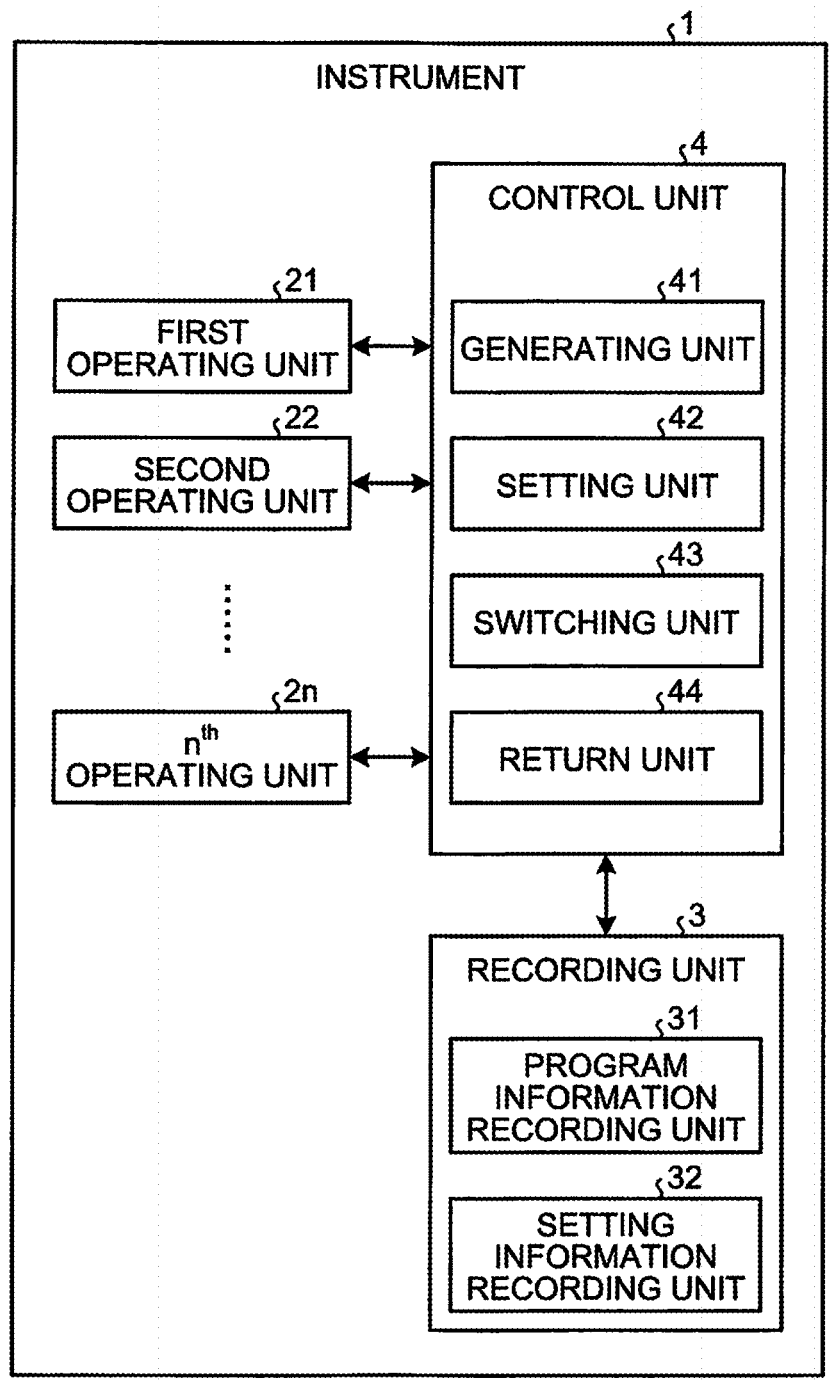
FIG. 1 is a block diagram schematically illustrating a functional configuration of an instrument according to a first embodiment.

In the following, modes for carrying out the present disclosure will be described in detail with reference to the accompanying drawings. However, the present disclosure is not limited to the embodiments described below. Furthermore, in the drawings used for the following description, shapes, sizes, and positional relationships are only schematically illustrated so that the content of the present disclosure may be understood. Namely, the present disclosure is not limited to only the shapes, the sizes, and the positional relationships illustrated in the drawings.

First Embodiment

Outline of Instrument

FIG. 1 is a block diagram schematically illustrating a functional configuration of an instrument according to a first embodiment of the present disclosure. An instrument 1 illustrated in FIG. 1 may be used in imaging devices, such as digital still cameras; mobile phones, such as smart phones; camcorders that are able to capture moving images; IC recorders having capturing functions; tablet terminals; microscopes each having imaging functions, such as video microscopes, which are able to observe cells, minerals, and the like; industrial or medical endoscopes; surgical operation systems that are able to perform a surgical operation by remote control; and monitoring systems that are able to capture images by remote control. Namely, the instrument 1 illustrated in FIG. 1 may be used as long as a user may assign an arbitrary operation function to each of a plurality of icons displayed by each of a plurality of operation members or displayed on a display monitor.

As illustrated in FIG. 1, the instrument 1 includes a first operating unit 21, a second operating unit 22 and, an $n^{th}$ operating unit 2n (n is an integer equal to or greater than 3) to each of which an arbitrary operation function may be assigned. The instrument 1 also includes a recording unit 3 that records various kinds of information on the instrument 1 and a control unit 4 that performs overall control of each of the units constituting the instrument 1.

The first operating unit 21, the second operating unit 22, and the $n^{th}$ operating unit 2n are constituted by using, for example, one of a switch, a button, a dial switch, a push switch, a toggle switch, and a lever switch and receive an input of an operation performed by a user. Furthermore, each of the first operating unit 21, the second operating unit 22, and the $n^{th}$ operating unit 2n may also be constituted by a different member, for example, each of the first operating unit 21 and the second operating unit 22 may also be constituted by a button and the $n^{th}$ operating unit 2n may also be constituted by a dial switch or the like.

The recording unit 3 is constituted by using a recording medium, such as a volatile memory, a nonvolatile memory, and a memory card, and records programs executed by the instrument 1 or data that is being processed. The recording unit 3 includes a program information recording unit 31 that records the programs executed by the instrument 1 and a setting information recording unit 32 that records a plurality of pieces of setting information on an arbitrary operation function assigned to each of the first operating unit 21, the second operating unit 22, and the $n^{th}$ operating unit 2n. Here, the operation function is at least one of a power supply off function that turns off the power supply of the instrument 1; an AF stop function that stops the function of autofocus (AF); an auto exposure lock (AEL) function that locks the function of exposure; a preview function that checks image data; a one-touch WB function that acquires white balance; and a button MySet function that calls the setting information and assigns and switches the operation function of each of the first operating unit 21, the second operating unit 22, and the $n^{th}$ operating unit 2n. Of course, as the operation function, in addition to the function related to the imaging device, it is conceivable to use a function, in a case of a mobile phone, that makes a call for communication to the outside or that reads an application; a function, in a case of a microscope, that changes the magnification or the intensity of illumination light; a function, in a case of an endoscope, that changes a wavelength band of illumination light, the zoom magnification of an optical system, and the like; a function, in a case of a surgical operation system, that replaces a treatment instrument, that changes the zoom magnification of an optical system, that changes field of view, and the like; a function, in a case of monitoring system, that switches monitoring cameras, that changes the zoom magnification of the monitoring camera, and the like.

The control unit 4 is constituted by using a central processing unit (CPU), an application specific integrated circuit (ASIC), a field programmable gate array (FPGA), or the like and controls each of the units constituting the instrument 1. The control unit 4 includes a generating unit 41, a setting unit 42, a switching unit 43, and a return unit 44.

The generating unit 41 generates a plurality of pieces of myset information each assigning an arbitrary operation function to each of the first operating unit 21, the second operating unit 22, and the $n^{th}$ operating unit 2n. For example, the generating unit 41 generates, as the setting information, a plurality of lists in which each of the plurality of operation functions selected by a user in accordance with an operation of the first operating unit 21 is assigned to the first operating unit 21, the second operating unit 22, and the $n^{th}$ operating unit 2n.

The setting unit 42 sets a setting operation member that sets, based on one of the plurality of pieces of setting information recorded by the setting information recording unit 32, each of the operation functions of the first operating unit 21, the second operating unit 22, and the $n^{th}$ operating unit 2n and to which a MySet function that switches to at least one of the plurality of pieces of setting information assigned to the first operating unit 21, the second operating unit 22, and the $n^{th}$ operating unit 2n. In the first embodiment, a description will be given with the assumption that the first operating unit 21 is the setting operation member.

If the first operating unit 21 is operated as the setting operation member, the switching unit 43 changes, based on the setting information assigned to the first operating unit 21, each of the operation functions of the second operating unit 22 and the nth operating unit 2n and inhibits a change in the operation function assigned to the first operating unit 21.

If the first operating unit 21 is operated after each of the operation functions of the second operating unit 22 and the $n^{th}$ operating unit 2n has been changed by the switching unit 43, the return unit 44 that returns each of the operation functions of the second operating unit 22 and the $n^{th}$ operating unit $2n$ to the operation functions used before each of the operation functions were changed by the switching unit 43.

Process Performed by the Instrument

Figure 2:
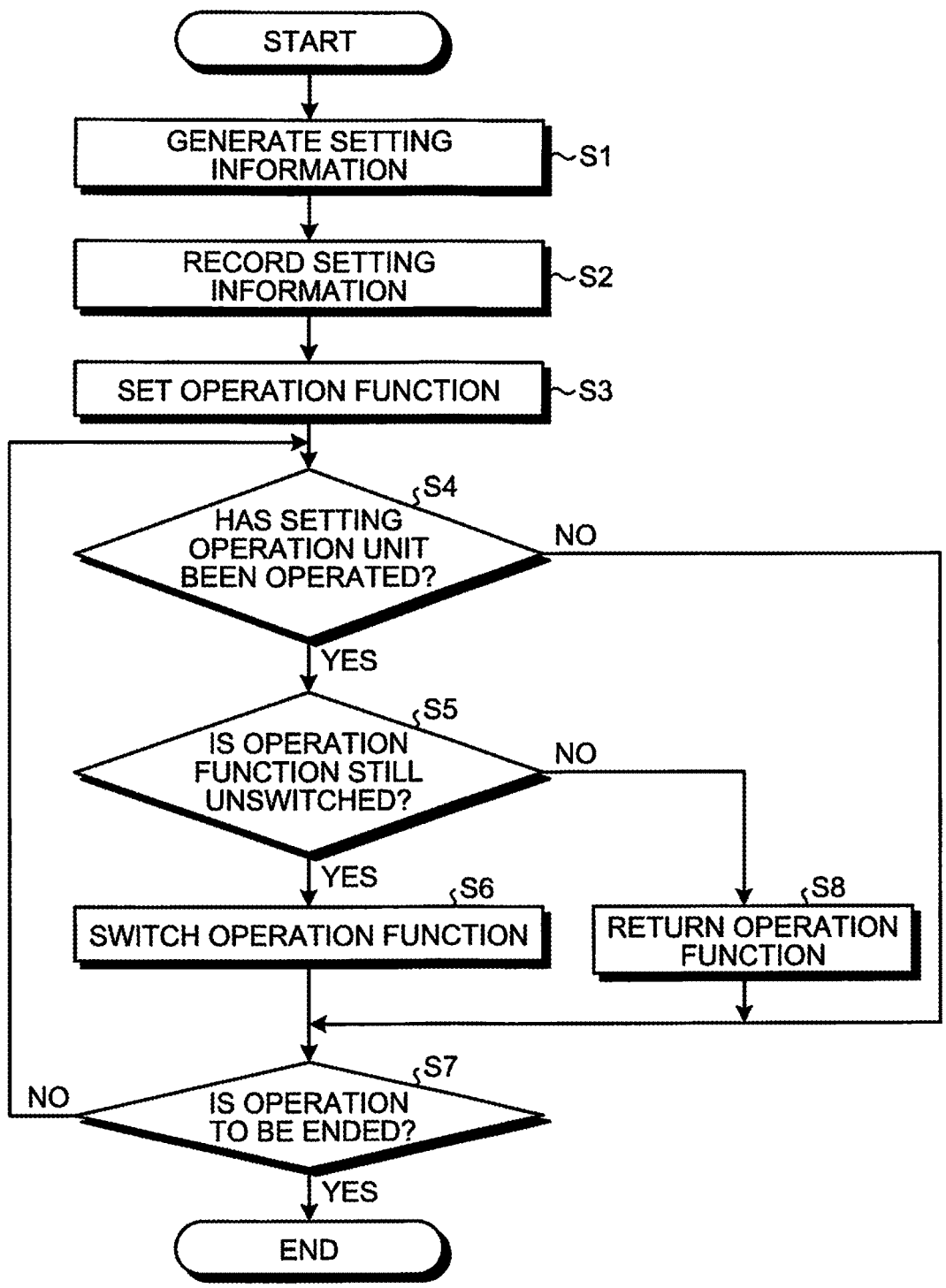
FIG. 2 is a flowchart illustrating an outline of a process performed by the instrument according to the first embodiment.

In the following, a process performed by the instrument 1 will be described. FIG. 2 is a flowchart illustrating an outline of the process performed by the instrument 1 according to the first embodiment.

As illustrated in FIG. 2, first, the generating unit 41 generates the setting information to which each of the plurality of operation functions selected by a user in response to the operation of the first operating unit 21 has been assigned to the first operating unit 21, the second operating unit 22, and the $n^{th}$ operating unit $2n$ (Step S1).

Subsequently, the setting information recording unit 32 records the setting information generated by the generating unit 41 (Step S2).

Thereafter, based on one of the plurality of pieces of setting information recorded by the setting information recording unit 32, the setting unit 42 sets each of the operation functions of the first operating unit 21, the second operating unit 22, and the $n^{th}$ operating unit $2n$ (Step S3). In this case, the setting unit 42 performs the setting in which the button MySet function is assigned to the first operating unit 21. Consequently, the first operating unit 21 functions as the setting operation member.

Subsequently, in a case where the first operating unit 21 is operated (Yes at Step S4), if the operation function has not been switched by the switching unit 43 (Yes at Step S5), the switching unit 43 switches, based on the setting information assigned to the first operating unit 21, the operation function of each of the second operating unit 22 and the $n^{th}$ operating unit $2n$ (Step S6). In this case, the switching unit 43 inhibits a change in the operation function assigned to the first operating unit 21. Specifically, the switching unit 43 inhibits the MySet function that is the function for reading the setting information and that has been assigned to the first operating unit 21 from being changed to the operation function that has been registered in the setting information. Consequently, because the user may immediately change the operation function to an arbitrary operation function and, because a change in the operation function of the first operating unit 21 is inhibited, the user may perform the operation of the instrument 1 without confusion even if the operation functions of the second operating unit 22 and the $n^{th}$ operating unit $2n$ have been changed.

Subsequently, if the operation of the instrument 1 is to be ended (Yes at Step S7), the instrument 1 ends the subject process. In contrast, if the operation of the instrument 1 is not to be ended (No at Step S7), the instrument 1 returns to Step S4 described above.

At Step S4, in a case where the first operating unit 21 is operated (Yes at Step S4), if the operation function has not been switched by the switching unit 43, i.e., if the operation function has been switched (No at Step S5), the return unit 44 returns each of the operation functions of the second operating unit 22 and the $n^{th}$ operating unit $2n$ to the operation functions that were used before the change performed by the switching unit 43 (Step S8). Consequently, the user reliably returns each of the operation functions of the second operating unit 22 and the $n^{th}$ operating unit $2n$ to their original state. After the process at Step S8, the instrument 1 proceeds to Step S7.

At Step S4, if the first operating unit 21 has not been operated (No at Step S4), the instrument 1 proceeds to Step S7.

According to the first embodiment of the present disclosure described above, because the switching unit 43 switches, based on the setting information assigned to the first operating unit 21, each of the operation functions of the second operating unit 22 and the $n^{th}$ operating unit $2n$ and inhibits a change in the operation function assigned to the first operating unit 21, even if the setting has been performed by assigning an arbitrary and predetermined operation function to each of the plurality of operating units, it is possible to immediately switch to the setting that has been assigned to the button MySet.

Furthermore, according to the first embodiment of the present disclosure, in a case where the first operating unit 21 is operated, if the operation function is in a switched state in which the operation function has been switched by the switching unit 43, because the return unit 44 returns each of the operation functions of the second operating unit 22 and the $n^{th}$ operating unit $2n$ to the operation functions used before the change performed by the switching unit 43, the operation functions may reliably be return to the original state.

[b] Second Embodiment

In the following, a second embodiment of the present disclosure will be described. In the first embodiment described above, the type of the instrument has not been specified; however, in the second embodiment, a description will be given by using, as an example of the instrument, an imaging device that is able to image an object and generating image data. In a description below, first, a configuration of an imaging device according to the second embodiment will be described and, then, a process performed by the imaging device according to the second embodiment will be described. Furthermore, components that are identical to those in the instrument 1 according to the first embodiment described above are assigned the same reference numerals and descriptions thereof will be omitted.

Configuration of the Imaging Device

Figure 3:
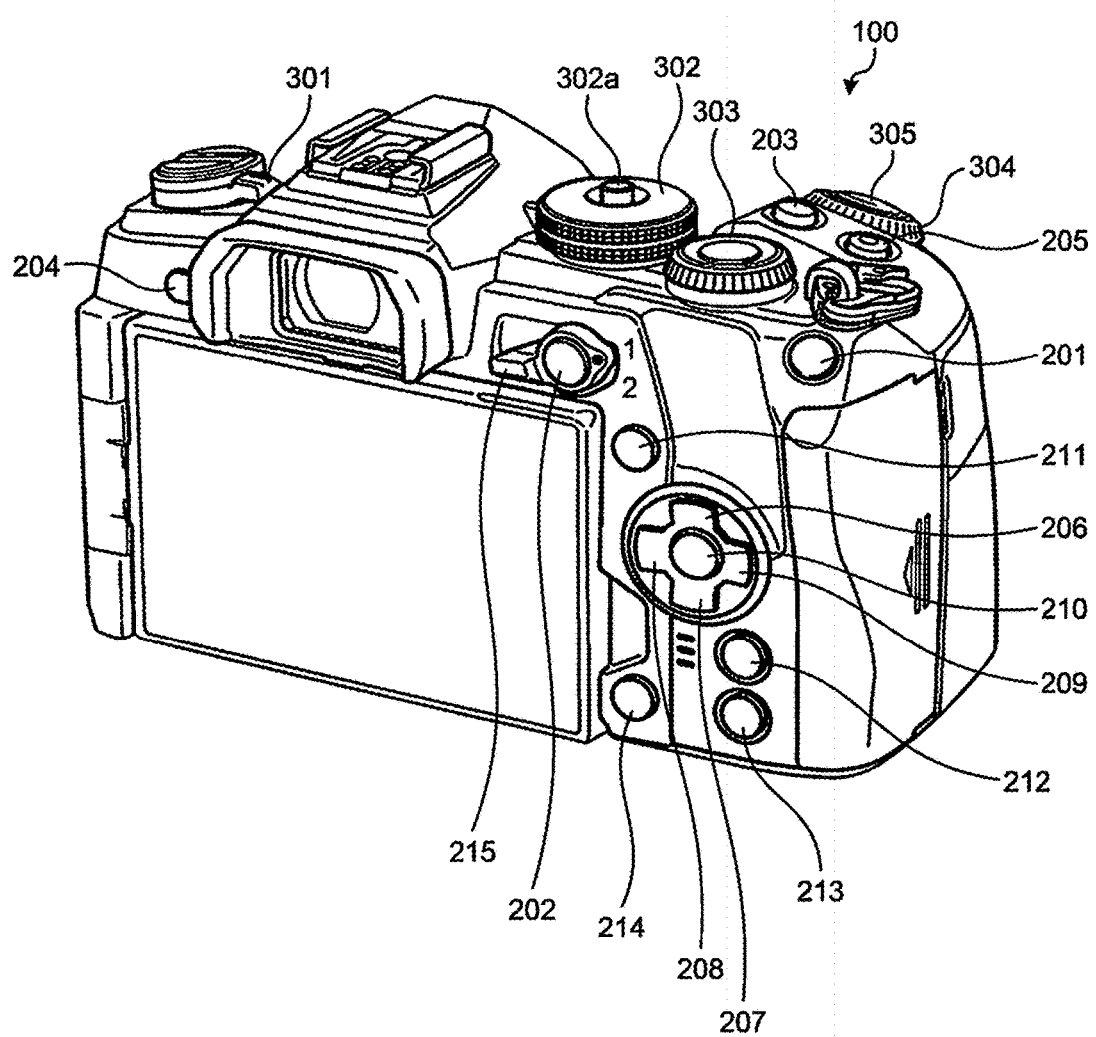
FIG. 3 is a perspective view illustrating, in outline, a configuration of an imaging device according to a second embodiment.
Figure 4:
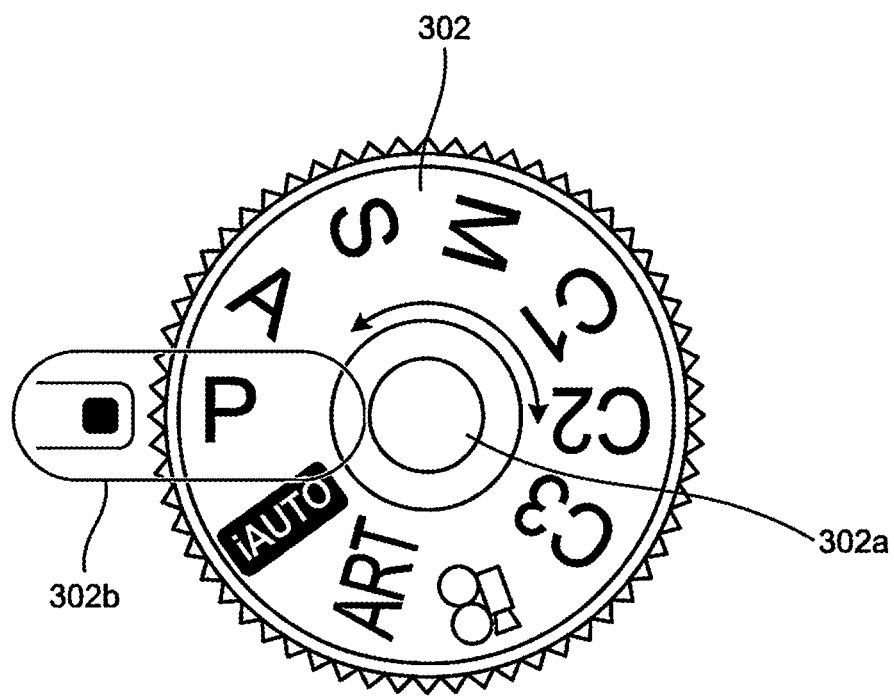
FIG. 4 is a top view of an example of an operation member illustrated in FIG. 3.
Figure 5:
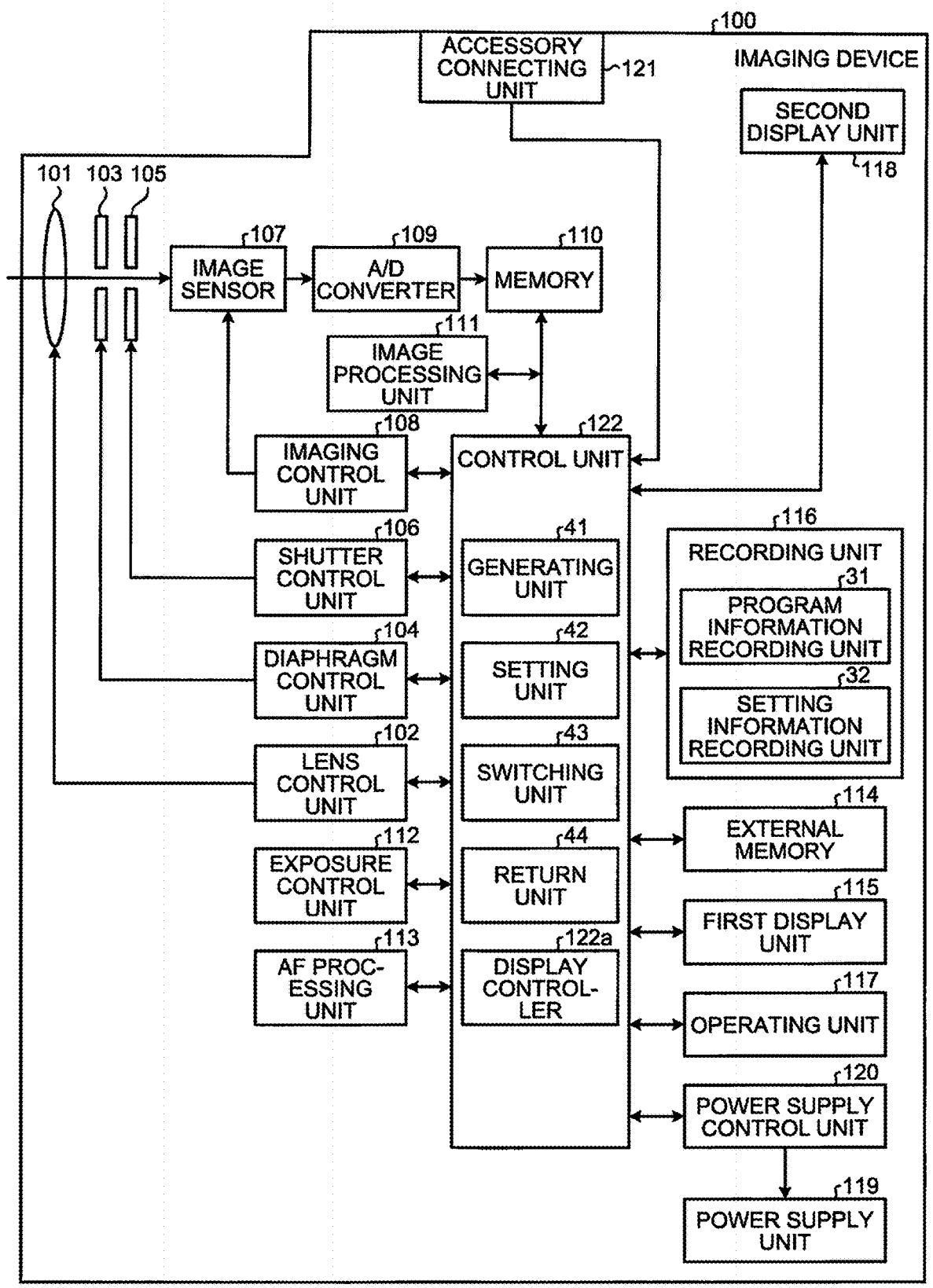
FIG. 5 is a block diagram schematically illustrating a functional configuration of the imaging device according to the second embodiment.

FIG. 3 is a perspective view illustrating, in outline, a configuration of an imaging device according to a second embodiment. FIG. 4 is a top view of an example of an operation member illustrated in FIG. 3. FIG. 5 is a block diagram schematically illustrating a functional configuration of the imaging device according to the second embodiment.

An imaging device 100 illustrated in FIG. 3 to FIG. 5 may generate image data and moving image data by capturing an object. For example, a digital still camera, an interchangeable lens digital still camera, a camcorder, or the like are used for the imaging device 100.

The imaging device 100 includes, a lens unit 101, a lens control unit 102, a diaphragm 103, a diaphragm control unit 104, a shutter 105, a shutter control unit 106, an image sensor 107, an imaging control unit 108, an A/D converter 109, a memory 110, an image processing unit 111, an exposure control unit 112, an AF processing unit 113, an external memory 114, a first display unit 115, a recording unit 116, an operating unit 117, a second display unit 118, a power supply unit 119, a power supply control unit 120, an accessory connecting unit 121, and a control unit 122.

The lens unit 101 forms an object image on a light-receiving surface of the image sensor 107. The lens unit 101 is constituted by using one or a plurality of lenses and a driving unit, such as a stepping motor, that moves these lenses along the direction of the optical axis. The lens unit 101 changes, under the control of the lens control unit 102, the focal position or the angle of view by moving along the direction of the optical axis.

The lens control unit 102 is constituted by using a driving driver or a control circuit that applies a voltage to the lens unit 101; moves, under the control of the control unit 122, the lens unit 101 in the optical direction by applying the voltage to the lens unit 101; and changes the focal position or the angle of view of the lens unit 101.

The diaphragm 103 adjusts, under the control of the diaphragm control unit 104, exposure by limiting an amount of incident light condensed by the lens unit 101.

The diaphragm control unit 104 is constituted by using a driving driver or a control circuit that applies a voltage to the diaphragm 103 and controls, under the control of the control unit 122, the F-number of the diaphragm 103 by applying a voltage to the diaphragm 103.

The shutter 105 sets, under the control of the shutter control unit 106, the state of the image sensor 107 to an exposure state or a light shielding state. The shutter 105 is constituted by using, for example, a focal-plane shutter or the like.

The shutter control unit 106 is constituted by using a driving driver or a control circuit that applies a voltage to the shutter 105 and switches, under the control of the control unit 122, the state of the shutter 105 to an exposure state or a light shielding state by applying the voltage to the shutter 105.

The image sensor 107 generates, under the control of the imaging control unit 108, image data (RAW data) by receiving an object image condensed by the lens unit 101 and performing photoelectric conversion and outputs the generated image data to the A/D converter 109. The image sensor 107 is constituted by using an image sensor, such as a charge coupled device (CCD) or a complementary metal oxide semiconductor (CMOS). Furthermore, a phase difference pixel may also be provided on the light-receiving surface of the image sensor 107.

The imaging control unit 108 is constituted by using a timing generator that controls the capturing timing of the image sensor 107 and causes, under the control of the control unit 122, the image sensor 107 to capture an image at predetermined timing.

By performing A/D conversion on the analog image data that has been input from the image sensor 107, the A/D converter 109 converts the analog image to digital image data and outputs the digital image data to the memory 110.

The memory 110 is constituted by using a frame memory, such as a VRAM or a DRAM; temporarily records the image data that has been input from the A/D converter 109 or the image data that has been subjected to image processing performed by the image processing unit 111; and outputs the recorded image data to the image processing unit 111 or the control unit 122.

The image processing unit 111 is constituted by using a graphics processing unit (GPU), an FPGA, or the like; acquires the image data recorded in the memory 110; performs image processing on the acquired image data; and outputs the image data to the memory 110 or the control unit 122. Here, an example of the image processing includes a demosaicing process, a gain up process, a white balance adjustment process, a noise reduction process, an image development process for generating JPEG data, or the like.

The exposure control unit 112 controls based on the image data that has been input via the control unit 122, exposure of the imaging device 100. Specifically, the exposure control unit 112 outputs a control parameter to the diaphragm control unit 104 and the shutter control unit 106 via the control unit 122 such that the exposure of the imaging device 100 is set to appropriate exposure.

The AF processing unit 113 controls the focal position of the imaging device 100 based on the image data that has been input via the control unit 122. The AF processing unit 113 uses one of a phase difference method, a contrast method, and a hybrid method that is a combination of the phase difference method and the contrast method and then outputs the control parameter related to the focal position of the imaging device 100 to the lens control unit 102 via the control unit 122.

The external memory 114 is attached so as to be freely attached to and removed from the outside of the imaging device 100 and records the image data that has been input from the control unit 122. The external memory 114 is constituted by using a recording medium, such as a memory card.

The first display unit 115 displays an image associated with the image data that has been input from the control unit 122 and various kinds of information. The first display unit 115 is constituted by using a liquid crystal display panel or an organic electro luminescence (EL) display panel. Furthermore, in a display area of the first display unit 115, a touch panel that detects a touch position indicated from the outside may be provided in a superimposed manner.

The recording unit 116 is constituted by using a volatile memory, a nonvolatile memory, or the like and records various kinds of information and programs related to the imaging device 100. The recording unit 116 includes the program information recording unit 31 and the setting information recording unit 32.

The operating unit 117 is constituted by using a plurality of operation members. The operating unit 117 is constituted by using, for example, one of a dial switch, a push switch, a toggle switch, and a lever switch and receives an input of an operation performed by a user. Specifically, the operating unit 117 includes, as illustrated in FIG. 3 and FIG. 4, an Fn1 button 201 (MySet button), an Fn2 button 202 (AEL button), an Fn3 button 203 (enlargement button), an Fn4 button 204 (monitor button), a moving image button 205, an upward button 206, a downward button 207, a leftward button 208, a rightward button 209, an OK button 210, an INFO button 211, a MENU button 212, a playback button 213, a deletion button 214, and an Fn lever 215. Furthermore, the operating unit 117 includes a power supply lever 301, a shooting mode dial 302, an R dial 303, an F dial 304, and a shutter button 305.

The Fn1 button 201 receives an input of an instruction signal that gives an instruction to read myset information.

The Fn2 button 202 receives an input of an instruction signal that indicates fixation of exposure.

The Fn3 button 203 receives an input of an instruction signal that gives an instruction to enlarge a live view to be displayed.

The Fn4 button 204 receives an input of an instruction signal that indicates the switching of a display of the first display unit 115 or the second display unit 118.

The moving image button 205 receives an input of an instruction signal that gives an instruction to capture a moving image.

The upward button 206 receives an input of an instruction signal that allows a cursor to move upward.

The downward button 207 receives an input of an input of an instruction signal that allows a cursor to move downward.

The leftward button 208 receives an input of an input of an instruction signal that allows a cursor to move leftward.

The rightward button 209 receives an input of an input of an instruction signal that allows a cursor to move rightward.

The OK button 210 receives an input of an instruction signal that determines a selected item.

The INFO button 211 receives an input of an instruction signal that causes information related to the imaging device 100 to be displayed on the first display unit 115.

The MENU button 212 receives an input of an instruction signal that allows a menu of the imaging device 100 to be displayed on the first display unit 115.

The playback button 213 receives an input of an instruction signal that gives an instruction to play back the image data recorded in the external memory 114.

The deletion button 214 receives an input of an instruction signal that gives an instruction to delete the image data recorded in the external memory 114.

The Fn lever 215 receives an input of an instruction signal that changes a capturing condition.

The power supply lever 301 receives an input of an instruction signal that gives an instruction to turn on or off the power supply of the imaging device 100.

The shooting mode dial 302 may rotate about an axis 302a, as illustrated in FIG. 4, and receives an input of an instruction signal that instructs a shooting mode stopped at the position of an indicator 302b. From among a plurality of shooting modes, each of the custom modes (a C1 mode, a C2 mode, and a C3 mode) is set by the setting unit 42, which will be described later, by assigning an operation function to each of the plurality of operating units based on different pieces of setting information.

The R dial 303 is able to rotate and receives an input of an instruction signal that changes a capturing parameter that has been set in the capturing condition.

The F dial 304 is able to rotate and receives an input of an instruction signal that changes a capturing parameter that has been set in the capturing condition.

The shutter button 305 receives an input of an instruction signal that gives an instruction to prepare for the capturing when the shutter button 305 is pressed halfway down and receives an input of an instruction signal that gives an instruction to capture an image when the shutter button 305 is pressed all the way down.

The second display unit 118 functions as an electronic viewfinder and displays images associated with image data and various kinds of information received from the control unit 122. The second display unit 118 is constituted by using a display panel, such as a liquid crystal panel or an organic EL panel, an eyepiece, an infrared sensor, and the like.

The power supply unit 119 is freely attached to and removed from the imaging device 100 and supplies, under the control of the power supply control unit 120, a predetermined voltage to each of the units that constitute the imaging device 100. The power supply unit 119 is constituted by using, for example, a rechargeable lithium-ion battery, a rechargeable nickel-metal hydride battery, or the like.

The power supply control unit 120 performs adjustment, under the control of the control unit 122, such that the voltage supplied by the power supply unit 119 is to be a predetermined voltage. The power supply control unit 120 is constituted by using a regulator.

The accessory connecting unit 121 is a unit to which an accessory, such as a flash device, a microphone, an external recorder, that are freely attached to and removed from the imaging device 100 is connected. The accessory connecting unit 121 transmits or receives a control signal in accordance with the predetermined communication standard to and from the accessory connected to the imaging device 100 and then outputs the control signal to the control unit 122.

The control unit 122 is constituted by using a CPU or an ASIC and performs overall control of each of the units that constitute the imaging device 100. The control unit 122 includes a generating unit 41, the setting unit 42, the switching unit 43, the return unit 44, and a display controller 122a.

The display controller 122a controls a display mode of the first display unit 115 and the second display unit 118. Specifically, the display controller 122a causes the first display unit 115 or the second display unit 118 to display a live view image associated with the image data generated by the image sensor 107 or various kinds of information related to the imaging device 100.

Method for Setting the Setting Information

In the following, a method for setting the setting information (MySet information) performed by a user will be described. FIG. 6 to FIG. 13 are diagrams each schematically illustrating an outline of a method for setting the setting information performed by the user.

Figure 6:
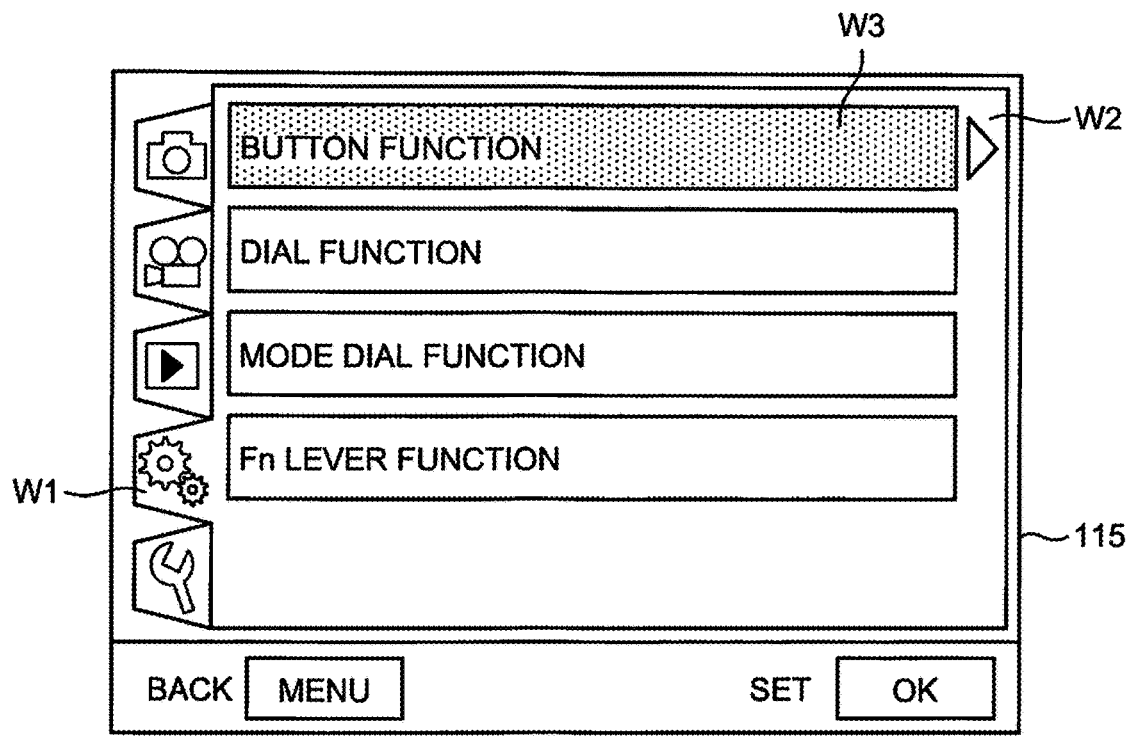
FIG. 6 is a diagram schematically illustrating an outline of a method for setting the setting information performed by a user.

As illustrated in FIG. 6, first, when a user operates the MENU button 212 and selects, by operating the downward button 207 or the like, a custom menu W1 on a menu screen, the display controller 122a causes the first display unit 115 to display an operation screen W2 that is used to arbitrarily set each of the operation functions of the plurality of operation members.

Figure 7:
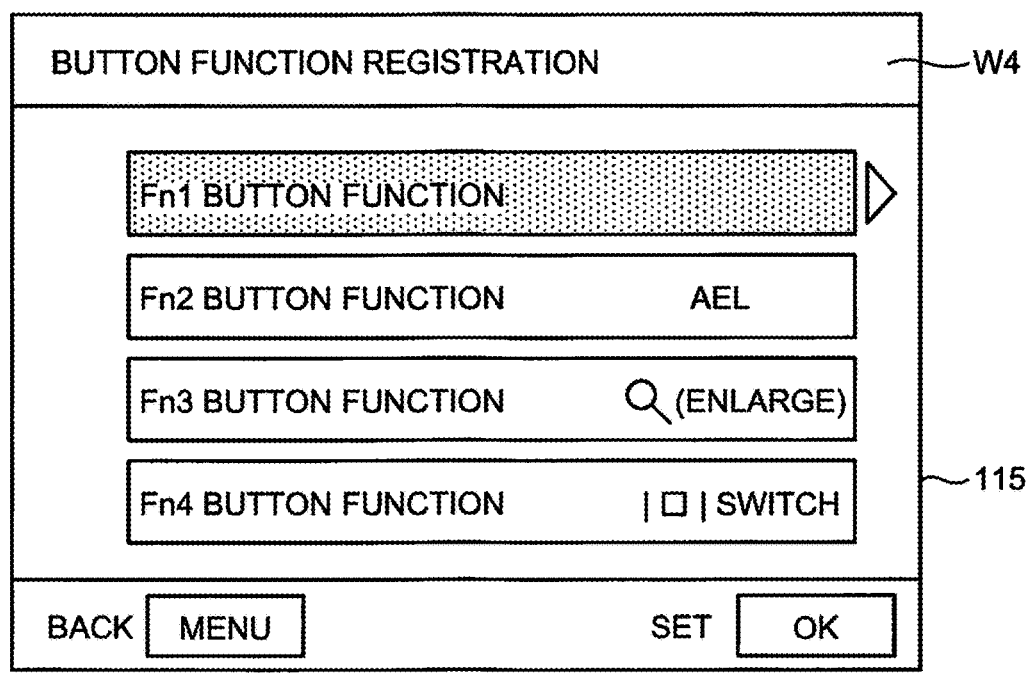
FIG. 7 is a diagram schematically illustrating an outline of a method for setting the setting information performed by a user.

Subsequently, when the user operates the OK button 210 and selects a button function W3, as illustrated in FIG. 7, the display controller 122a causes the first display unit 115 to display a button function registration screen W4 that is used to register a button function (FIG. 6 to FIG. 7).

Figure 8:
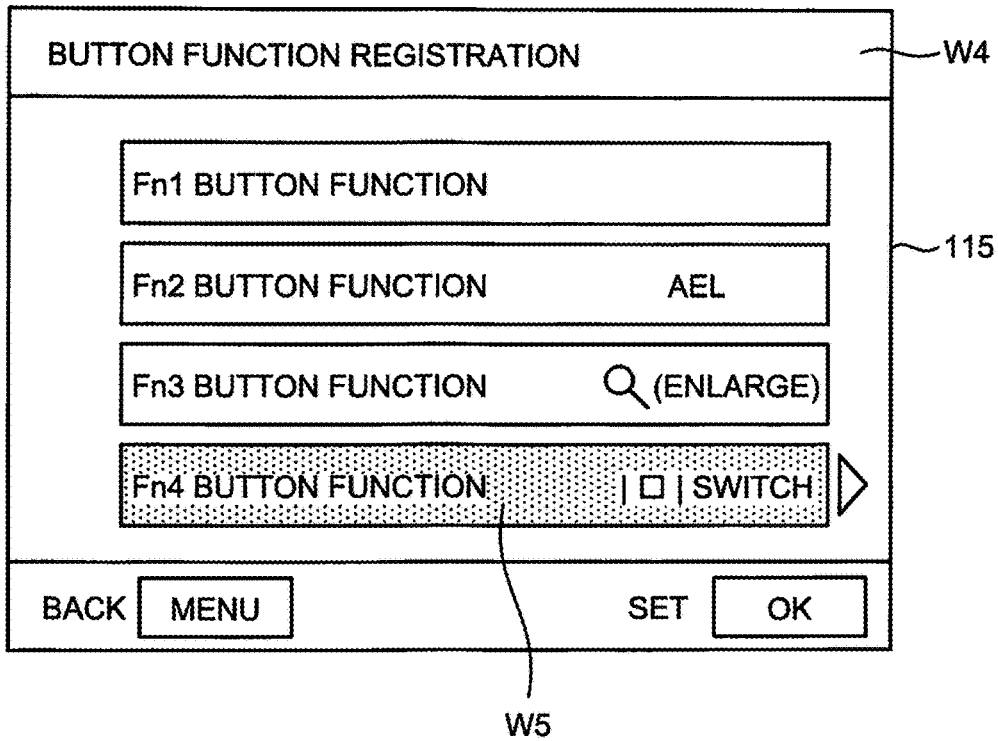
FIG. 8 is a diagram schematically illustrating an outline of a method for setting the setting information performed by a user.

Thereafter, as illustrated in FIG. 8, the user selects a desired button by operating the downward button 207 or the like (FIG. 7 to FIG. 8). Furthermore, in FIG. 7 and FIG. 8, on the button function registration screen W4, only four operation members are displayed; however, as indicated by an operation member list table T1 illustrated in FIG. 9, the user may select another operation member by operating the upward button 206 or the downward button 207.

Figure 9:
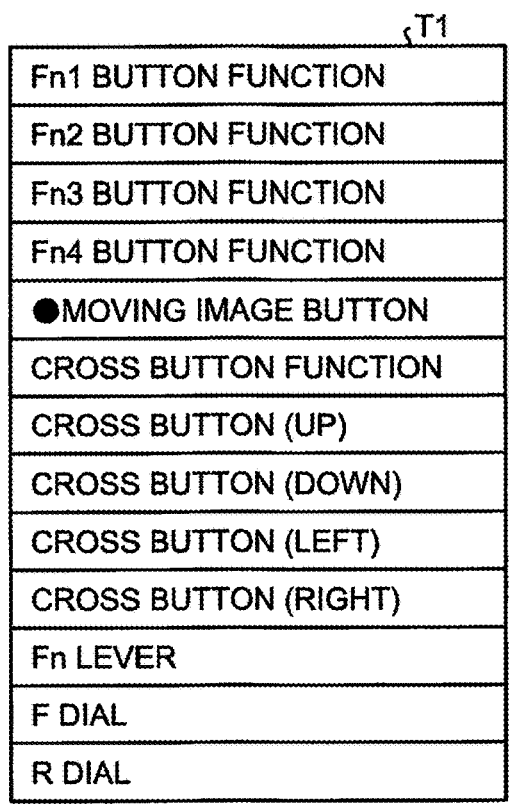
FIG. 9 is a diagram schematically illustrating an outline of a method for setting the setting information performed by a user.

Then, if the user selects a Fn4 button function W5, the display controller 122a causes the first display unit 115 to display, as illustrated in FIG. 10, an Fn4 button function registration screen W6 (FIG. 8 to FIG. 10).

Subsequently, the user assigns the operation function of the Fn4 button 204 by operating the downward button 207 or the like. In this case, the display controller 122a causes the first display unit 115 to display the operation function that is a set value that has been assigned to the Fn4 button 204. Here, the options that may be assigned to the operation member are indicated by a button registration function list table T2 illustrated in FIG. 11. Furthermore, the list of the button registration functions illustrated in FIG. 11 may appropriately be changed and includes, in a case other than the imaging device 100, a function unique to an endoscope or a function unique to a microscope and includes, in a case of, for example, an endoscope, a function for switching the wavelength bands of illumination light. The user may perform the setting by selecting the function listed in the button registration function list table T2 and by assigning an arbitrary operation function.

Figure 12:
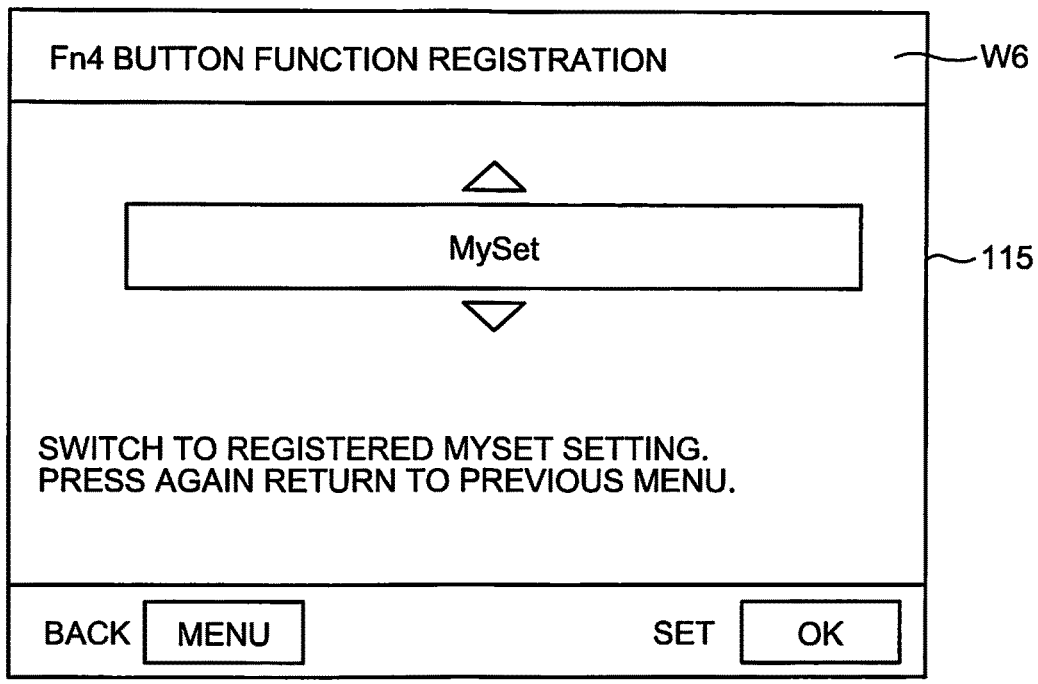
FIG. 12 is a diagram schematically illustrating an outline of a method for setting the setting information performed by a user.
Figure 13:
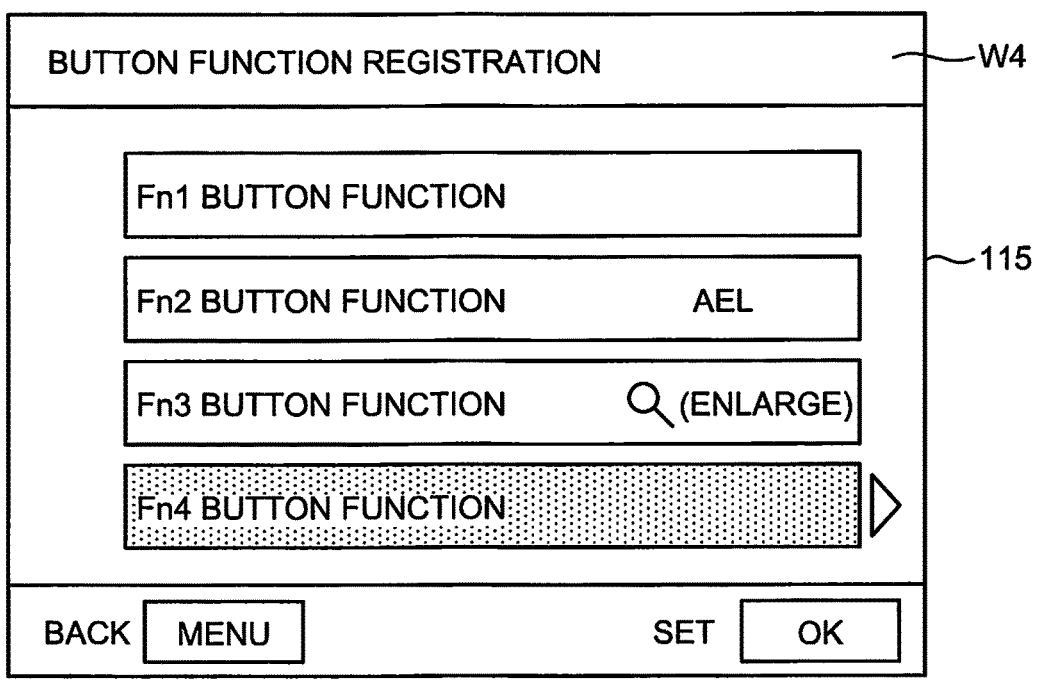
FIG. 13 is a diagram schematically illustrating an outline of a method for setting the setting information performed by a user.

Thereafter, after the user operates the downward button 207 or the like and selects MySet from the button registration function list table T2 (FIG. 10 to FIG. 12), if the user operates the OK button 210, the operation function for reading MySet is assigned and set to the operation function of the Fn4 button 204 (FIG. 12 to FIG. 13). In this way, based on the operation of the operating unit 117 performed by the user, the generating unit 41 may assign an arbitrary operation function to each of the operation members from among the options. A plurality of sets of these assigned operation functions may be registered and recorded in the setting information recording unit 32 as a plurality of pieces of setting information (for example, MySet1 to MySet4) by a menu operation (not illustrated).

Process Performed by the Imaging Device

Figure 14:
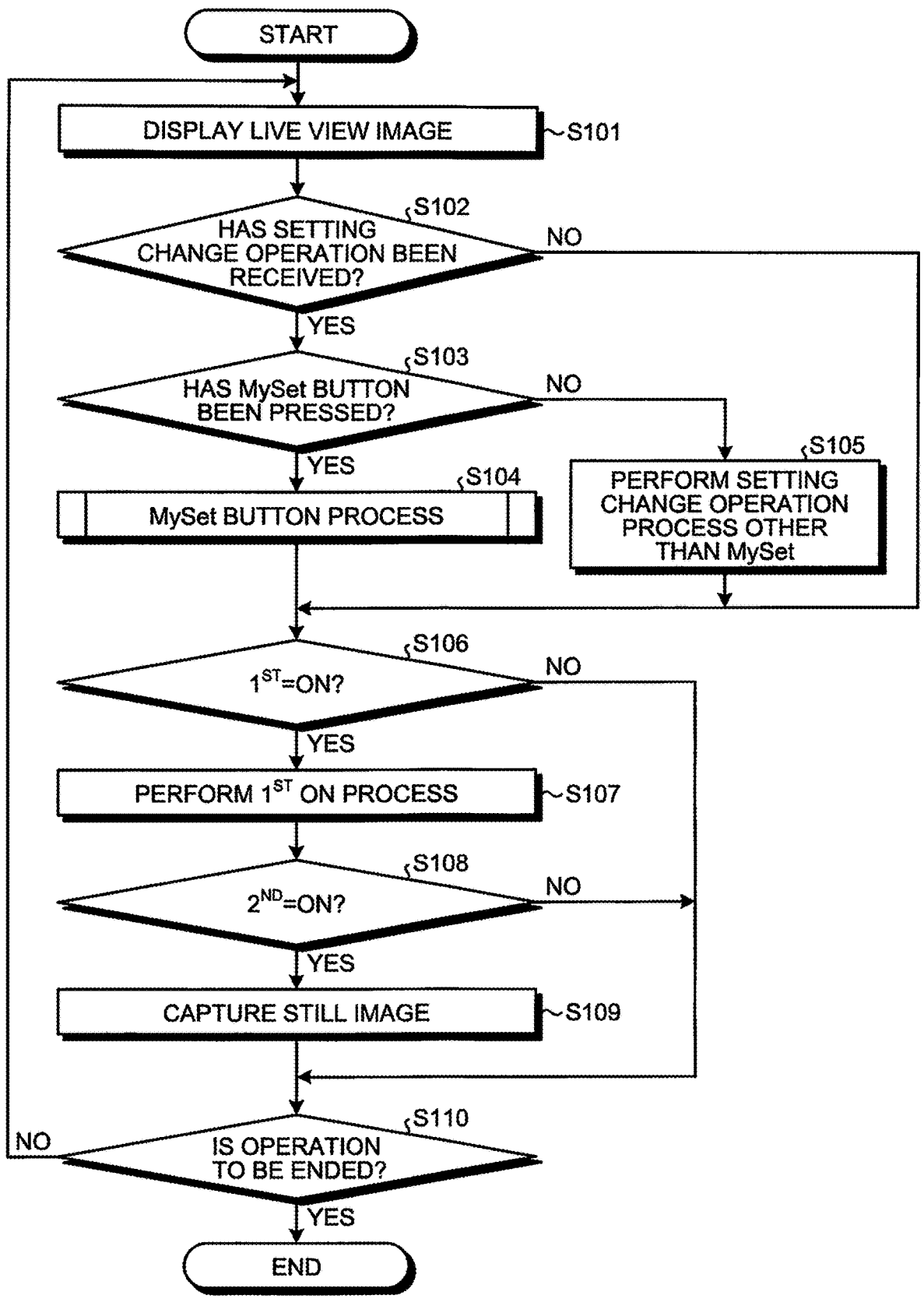
FIG. 14 is a flowchart illustrating an outline of a process performed by the imaging device according to the second embodiment.

In the following, a process performed by the imaging device 100 will be described. FIG. 14 is a flowchart illustrating an outline of a process performed by the imaging device 100 according to the second embodiment. Furthermore, in a description below, a description will be given with the assumption that, as a base set value (basic setting) of the imaging device 100, an operation function for receiving an input of an instruction signal that switches to the setting information (for example, MySet1) has been assigned to the Fn1 button 201 (hereinafter, referred to as a "MySet button 201"). Namely, in the second embodiment, the MySet button 201 functions as a setting operation member.

As illustrated in FIG. 14, first, the control unit 122 causes the first display unit 115 to display the live view image associated with the image data generated by the image sensor 107 (Step S101). In this case, the control unit 122 causes the image sensor 107 to capture an image and generate image data and causes the image processing unit 111 to perform image processing on the image data and output the image data to the first display unit 115.

Subsequently, in a case where a setting change operation of the imaging device 100 has been received (Yes at Step S102), if the MySet button 201 is pressed (Yes at Step S103), the imaging device 100 performs MySet button process for switching each of the operation functions of the plurality of operation members (Step S104). Furthermore, the MySet button process in detail will be described later. After the process at Step S104, the imaging device 100 proceeds to Step S106.

At Step S102, in a case where a setting change operation of the imaging device 100 has been received (Yes at Step S102), if the MySet button 201 has not been pressed (No at Step S103), the control unit 122 performs, in response to the operation performed on the buttons, such as the Fn lever 215 and each of the dials, that are other than the MySet button 201, a setting change operation process other than MySet that switches capturing parameters (for example SS, the F-number, and ISO sensitivity) or shooting modes (a P mode, an A mode, an S mode, an M mode, a C1 mode, etc.) of the imaging device 100 (Step S105). Specifically, if the shooting mode dial 302 has been operated, the control unit 122 switches the shooting mode of the imaging device 100 from the P mode to the A mode. Furthermore, when the R dial 303 has been operated, if the capturing parameter assigned to the R dial 303, for example, the operation function assigned to the R dial, is a change in the F-number, the control unit 122 changes the F-number in accordance with the rotation of the R dial 303. After the process at Step S105, the imaging device 100 proceeds to Step S106.

At Step S106, if the $1^{st}$ release enters an on state due to the shutter button 305 being pressed halfway down (Yes at Step S106), the imaging device 100 causes, based on the image data generated by the image sensor 107, the lens unit 101 to perform focusing and performs a $1^{st}$ ON process for setting appropriate exposure (Step S107). After the process at Step S107, the imaging device 100 proceeds to Step S108 that will be described later.

At Step S106, if the $1^{st}$ release does not enter the on state without the shutter button 305 being pressed halfway down (No at Step S106), the imaging device 100 proceeds to Step S110 that will be described later.

At Step S108, if the $2^{nd}$ release enters the on state due to the shutter button 305 being pressed all the way down (Yes at Step S108), the imaging device 100 causes the image sensor 107 to perform still image capturing (Step S109). After the process at Step S109, the imaging device 100 proceeds to Step S110 that will be described later. In contrast, if the $2^{nd}$ release does not enter the on state without the shutter button 305 being pressed all the way down (No at Step S108), the imaging device 100 proceeds to Step S110 that will be described later.

At Step S110, if the power supply lever 301 is operated and the operation is to be ended (Yes at Step S110), the imaging device 100 ends the process. In contrast, if the power supply lever 301 is not operated and the operation is not ended (No at Step S110), the imaging device 100 returns to Step S101.

MySet Button Process

Figure 15:
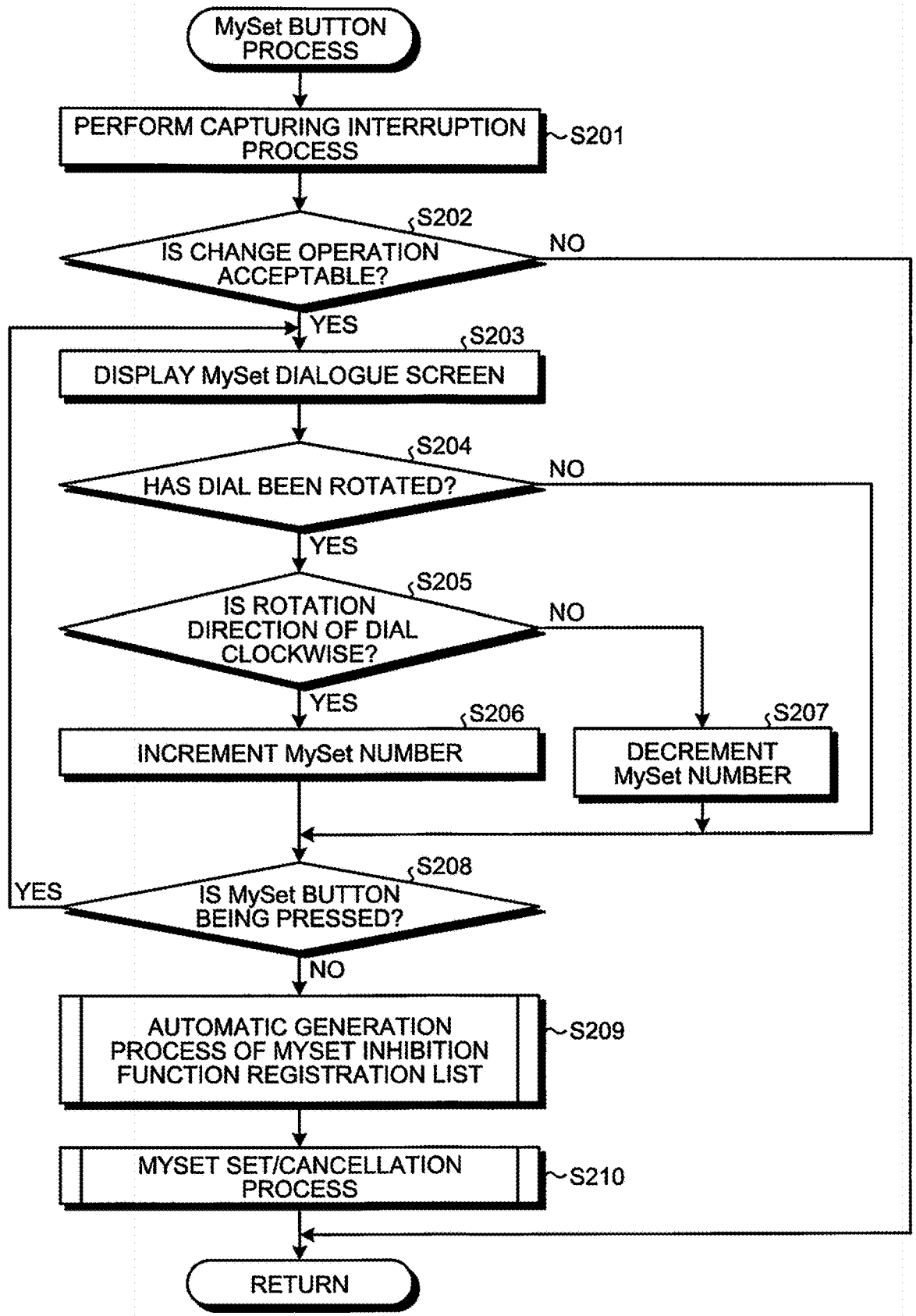
FIG. 15 is a flowchart illustrating an outline of a MySet button process illustrated in FIG. 14.

In the following, the MySet button process described at Step S104 illustrated in FIG. 14 will be described. FIG. 15 is a flowchart illustrating an outline of the MySet button process.

As illustrated in FIG. 15, first, the control unit 122 performs a capturing interruption process of the imaging device 100 (Step S201). Specifically, the control unit 122 interrupts or ends the capturing, such as moving image capturing in which the imaging device 100 generates moving image data, TIME capturing in which the image sensor 107 is allowed to exposure only the period of time for which the shutter button 305 is being pressed all the way down, and interval capturing (time-lapse capturing) in which capturing is continuously performed at predetermined intervals, that is automatically continued by the imaging device 100.

Subsequently, the control unit 122 determines whether the state of the imaging device 100 may receive a change operation (Step S202). Specifically, because the external memory 114 is inhibited to change memory mapping due to a change in the capturing parameter of the imaging device 100 during a period of time for which image data or the like is being recorded, the control unit 122 determines whether the external memory 114 is in a process of recording image data or the like. Namely, if the external memory 114 is in a process of recording image data or the like, the control unit 122 does not accept various setting changes performed by using the MySet button 201. If it is determined, by the control unit 122, that the state of the imaging device 100 is in a state in which the imaging device 100 may receive a change operation (Yes at Step S202), the imaging device 100 proceeds to Step S203 that will be described later. In contrast, if it is determined, by the control unit 122, that the imaging device 100 is not the state in which the imaging device 100 is not able to accept a change operation (No at Step S202), the imaging device 100 returns to the main routine illustrated in FIG. 14.

Figure 16:
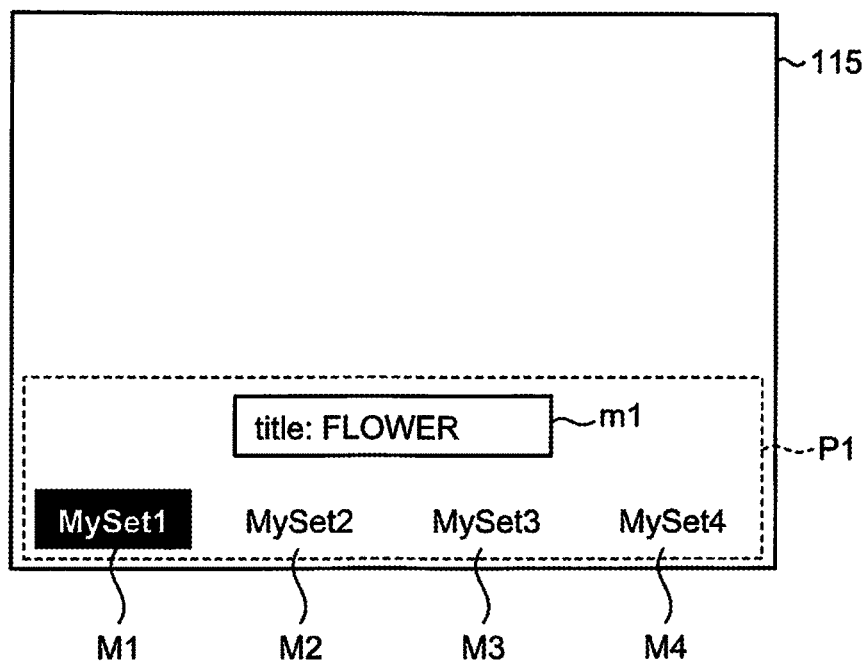
FIG. 16 is a diagram schematically illustrating an example of an image displayed by the imaging device according to the second embodiment.
Figure 17:
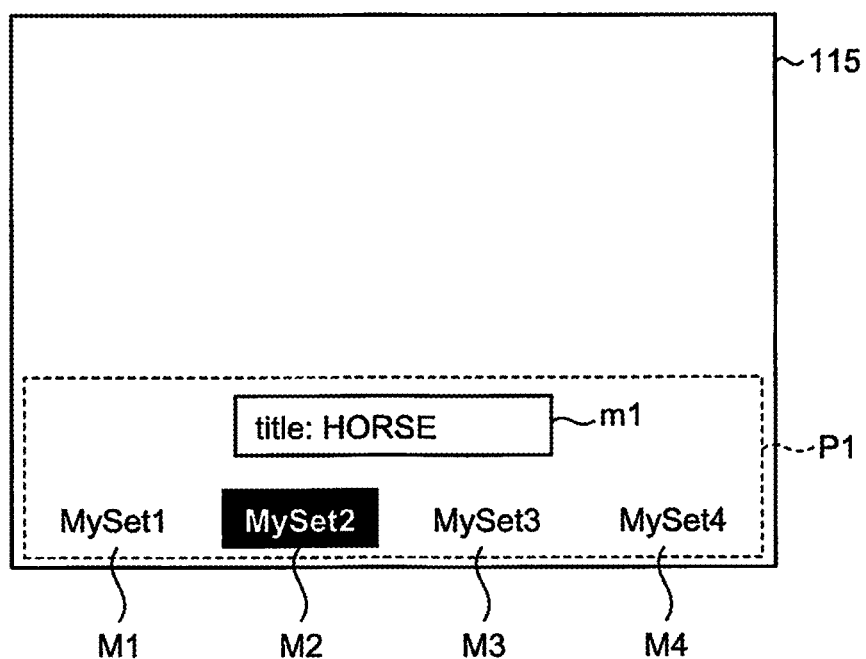
FIG. 17 is a diagram schematically illustrating an example of an image displayed by the imaging device according to the second embodiment.

At Step S203, the display controller 122a causes the first display unit 115 to display a MySet dialogue screen. Specifically, as illustrated in FIG. 16 and FIG. 17, the display controller 122a causes the first display unit 115 to display a MySet dialogue screen P1. The MySet dialogue screen P1 includes a MySet1 Ml, a MySet2 M2, a MySet3 M3, and a MySet4 M4 that are associated with the corresponding pieces of myset information recorded in setting information recording unit 32. Furthermore, the display controller 122a highlights the currently selected setting information (for example, the MySet1 M1) and displays a title m1 of the setting information registered by a user with respect to the currently selected setting information. The user selects desired setting information by rotating a dial, for example, the R dial 303. In this case, the display controller 122a changes the setting information that is to be highlighted in response to the rotation of the R dial 303 and causes the first display unit 115 to display the setting information by changing the title (FIG. 16 to FIG. 17).

Subsequently, in a case where the dial is rotated (Yes at Step S204), if the rotation direction of the dial is a clockwise (Yes at Step S205), the control unit 122 increments the MySet number (Step S206). After the process at Step S206, the imaging device 100 proceeds to Step S208 that will be described later.

At Step S204, in a case where the dial is rotated (Yes at Step S204), if the rotation direction of the dial is not a clockwise (No at Step S205), the control unit 122 decrements the MySet number (Step S207). After the process at Step S207, the imaging device 100 proceeds to Step S208 that will be described later.

At Step S204, in a case where the dial is not rotated (No at Step S204), the imaging device 100 proceeds to Step S208 that will be described later.

At Step S208, if the MySet button 201 is being pressed (Yes at Step S208), the imaging device 100 returns to Step S203 described above. In contrast, if the MySet button 201 is not being pressed (No at Step S208), the imaging device 100 proceeds to Step S209 that will be described later.

At Step S209, the imaging device 100 performs an automatic generation process of a myset inhibition function registration list for automatically generating a registration list of a myset inhibition function. Furthermore, a description of the automatic generation process of the myset inhibition function registration list will be described later in detail.

Subsequently, the imaging device 100 performs a myset set/cancellation process of assigning the setting information selected by the user to each of the plurality of operation members (Step S210). Furthermore, the myset set/cancellation process will be described in detail later. After the process at Step S210, the imaging device 100 returns to the main routine illustrated in FIG. 14.

Automatic Generation Process of the Myset Inhibition Function Registration List

Figure 18:
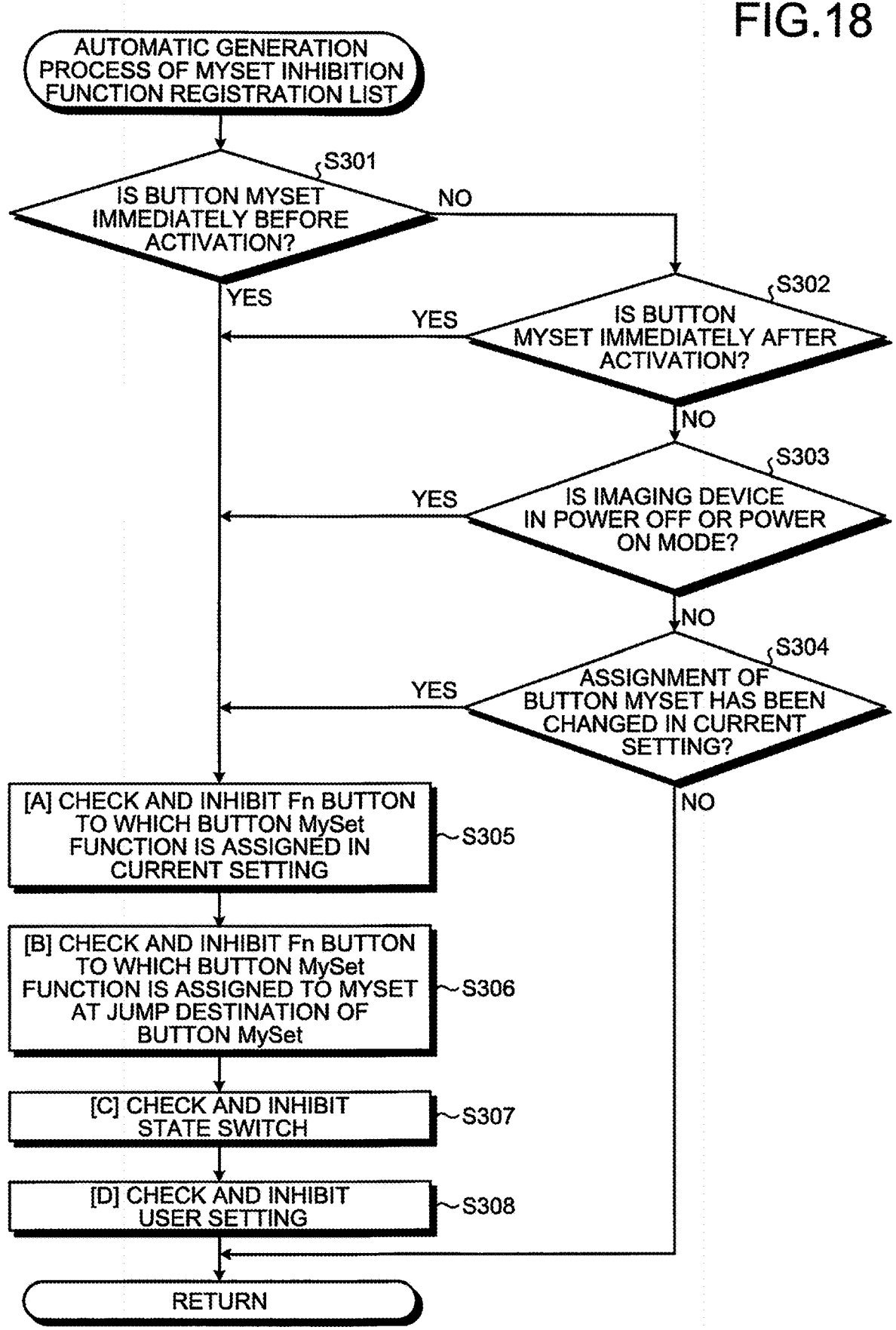
FIG. 18 is a flowchart illustrating an outline of an automatic generation process of a myset inhibition function registration list illustrated in FIG. 15.

In the following, the automatic generation process of the myset inhibition function registration list described at Step S209 with reference to FIG. 15 will be described. FIG. 18 is a flowchart illustrating an outline of automatic generation process of the myset inhibition function registration list.

As illustrated in FIG. 18, first, the control unit 122 determines whether the button myset is immediately before activation (Step S301). If it is determined, by the control unit 122, that the button myset is immediately before activation (Yes at Step S301), the imaging device 100 proceeds to Step S305 that will be described later. In contrast, if it is determined by the control unit 122, that the button myset is not immediately before activation (No at Step S301), the imaging device 100 proceeds to Step S302 that will be described later.

At Step S302, the control unit 122 determines whether the button myset is immediately after the activation. If it is determined by the control unit 122 that the button myset is immediately after the activation (Yes at Step S302), the imaging device 100 proceeds to Step S305 that will be described later. In contrast, if it is determined by the control unit 122 that the button myset is not immediately after the activation (No at Step S302), the imaging device 100 proceeds to Step S303 that will be described later.

At Step S303, the control unit 122 determines whether the imaging device 100 is in a POWER_OFF or a POWER_ON mode. If it is determined by the control unit 122 that the imaging device 100 is in a POWER_OFF or a POWER_ON mode (Yes at Step S303), the imaging device 100 proceeds to Step S305 that will be described later. In contrast, if it is determined by the control unit 122 that the imaging device 100 is not in a POWER_OFF or a POWER_ON mode (No Step S303), the imaging device 100 proceeds to Step S304 that will be described later.

At Step S304, the control unit 122 determines whether assignment of the button myset has been changed in current setting. If it is determined by the control unit 122 that assignment of the button myset has been changed in current setting (Yes at Step S304), the imaging device 100 proceeds to Step S305 that will be described later. In contrast, if it is determined by the control unit 122 that assignment of the button myset has not been changed in current setting (No at Step S304), the imaging device 100 returns to the subroutine illustrated in FIG. 15.

At Step S305, the switching unit 43 checks the Fn button to which the button MySet function has been assigned in the current setting and then inhibits the Fn button.

Subsequently, the switching unit 43 checks and inhibits the Fn button to which the button MySet function has been assigned to the myset at the jump destination of the button MySet (Step S306) and then checks and inhibits the Fn lever 215 that is a state switch (Step S307).

Thereafter, the switching unit 43 checks and inhibits the user setting in which the operation member that is desired to be inhibited by the user and that is previously registered (Step S308). In the embodiment illustrated in FIG. 19 and FIG. 20, the F dial and the R dial are inhibited by the user.

After the process at Step S308, the imaging device 100 returns to the subroutine illustrated in FIG. 15.

In the following, an outline of the automatic generation process of the myset inhibition function registration list will be described. FIG. 19 and FIG. 20 are diagrams each illustrating an outline of the automatic generation process of the myset inhibition function registration list. In FIG. 19, a case in which the shooting mode of the imaging device 100 is set to the P mode will be described. Furthermore, in FIG. 19, as a base set value (initial setting) of the imaging device 100, a case of the setting in which the button MySet function is assigned to the Fn1 button 201 will be described. Furthermore, in FIG. 20, a case in which the shooting mode of the imaging device 100 is set to the C1 mode will be described. Furthermore, in FIG. 20, a case of the setting in which the button MySet function is assigned to the Fn2 button 202 will be described.

First, a case in which the P mode is set as the shooting mode of the imaging device 100 will be described. As indicated by [A] illustrated in FIG. 19, the switching unit 43 checks the Fn1 button 201 to which the button MySet function has been assigned at the base set value that is the current setting and inhibits the button MySet function from being changed to the operation function that was set at the other MySet1 to MySet4. Specifically, if the other operation functions have been set to MySet1 to MySet4 by the setting unit 42, for example, if a RAW switch function has been set to MySet2, even when the imaging device 100 activates the button MySet, the Fn1 button 201 to which the button MySet function has been assigned inhibits a change in the MySet function as an operation function (XA indicates, based on the rule of [A], a function change of MySet1 to MySet4 to the registration value is inhibited). Consequently, even when the Fn1 button 201 is pressed, because the operation function of the Fn1 button 201 is maintained without being changed, even when the Fn1 button 201 is pressed again, the Fn1 button 201 may reliably return to the original operation state.

Furthermore, as indicated by [B] illustrated in FIG. 19, the switching unit 43 checks the Fn button to which the button MySet function has been assigned by myset at the jump destination of the button MySet and inhibits the Fn button. Specifically, in a case in which MySet3 with the myset registration value is set in the imaging device 100, when MySet1 that is a MySet1 call function has been set to the operation function Fn4 button 204 and MySet2 that is a MySet2 call function has been set by the setting unit 42 to the operation function of the moving image button 205, the switching unit 43 inhibits a change in each of the operation functions of the Fn4 button 204 and the moving image button 205 to the MySet call function and inhibits the MySet call functions from being carelessly increased. (XB indicates, based on the rule of [B], a function change in MySet1 to MySet4 to the registration value is inhibited). Here, when MySet3 has been called, the function change in the Fn4 button 204 and the moving image button 205 is inhibited; however, it may also possible to configure such that a call of each for MySet1, MySet2, and MySet4 are inhibited.

As described above, by inhibiting a change in operation function of a button assigned by the button MySet at the transition source of MySet, it is possible to prevent the number of operating units in each of which a button MySet function is assigned from being decreased. Thus, because a reliable and prompt return to the original state is secured and an increase or decrease in MySet functions is inhibited, it is possible to prevent transition of MySet multiple times and it is possible for a user to perform a stable MySet transition operation.

Furthermore, as indicated by [C] illustrated in FIG. 19, the switching unit 43 checks and inhibits the Fn lever 215. Specifically, in a case in which the setting unit 42 sets each of the operation functions to MySet1 to MySet4, even when the imaging device 100 activates the button MySet1, the switching unit 43 sets a registration value $X_C$ for inhibiting a change in a mode 1 (2×2 dial) of the operation function assigned to the Fn lever 215. Consequently, because a change in operation function of the Fn lever 215 is inhibited, it is possible to reliably prevent abrupt transition to an unintended state or a less predictable state, for a user, in conjunction with MySet transition and it is possible to perform a stable MySet transition operation. Consequently, it is possible to avoid missing a good shot of an object.

Furthermore, as indicated by [D] illustrated in FIG. 19, the switching unit 43 checks and inhibits the user setting. Specifically, in a case in which the setting unit 42 has set each of the operation functions to MySet1 to MySet4, even when the imaging device 100 activates the button MySet1, the switching unit 43 inhibits a change in the operation function assigned to each of the R dial 303 and the F dial 304. Consequently, because a change in operation function of each of the R dial 303 and the F dial 304 has been inhibited, it is possible to reliably prevent transition to an unintended state or a less predictable state, for a user, in conjunction with MySet transition and it is possible to perform a stable MySet transition operation. Consequently, it is possible to avoid missing a good shot of an object caused by the user to carelessly change the capturing condition.

In the following, a case in which the imaging device 100 is set to the C1 mode will be described. If the mode dial is set to C1, the operation function that has been set to MySet1 is set. Similarly, if the mode dial is set to C2, the setting is performed with the content of MySet2; if the mode dial is set to C3, the setting is performed with the content of MySet3; and this state corresponds to the state of transition source. In FIG. 20, C1, i.e., the content of the setting performed by MySet2 corresponds to the transition source and temporary transition to another MySet state is to be performed. As indicated by [A] illustrated in FIG. 20, in MySet1 that has been set to the myset registration value, the switching unit 43 checks the Fn1 button 201 to which the button MySet function has been assigned and inhibits the button MySet function from being changed to one of the operation functions that have been set by the other MySet2 to MySet4. Specifically, if the other operation functions haven been set to MySet1 to MySet4 by the setting unit 42, for example, if a hand-shake correction function has been set to MySet2, even when the imaging device 100 activates the button MySet, the Fn2 button 203 to which the button MySet function has been assigned inhibits a change in the MySet function as the operation function. Consequently, even when the Fn1 button 201 is pressed, because the operation function of the Fn1 button 201 is maintained without being changed, even when the Fn1 button 201 is pressed again, the Fn1 button 201 may reliably return to the original operation state.

Furthermore, as indicated by [B] illustrated in FIG. 20, the switching unit 43 checks the Fn button to which the button MySet function has been assigned by myset at the jump destination of the button MySet and inhibits the Fn button. Specifically, in a case in which MySet3 with the myset registration value is set in the imaging device 100, when MySet1 has been set to the operation function of the Fn4 button 204 and MySet2 has been set to the operation function of the moving image button 205 by the setting unit 42, the switching unit 43 inhibits each of the operation functions of the Fn4 button 204 and the moving image button 205 from being changed to MySet1 and MySet2, respectively.

Furthermore, as indicated by [C] illustrated in FIG. 20, the switching unit 43 checks and inhibits the Fn lever 215. Specifically, in a case in which the setting unit 42 sets each of the operation functions to MySet1 to MySet4, even when the imaging device 100 activates the button MySet3, the switching unit 43 inhibits a change in the mode 1 (2×2 dial) of the operation function assigned to the Fn lever 215.

Furthermore, as indicated by [D] illustrated in FIG. 20, the switching unit 43 checks and inhibits the user setting. Specifically, in a case in which the setting unit 42 has set each of the operation functions to MySet1 to MySet4, even when the imaging device 100 activates the button MySet1, the switching unit 43 inhibits a change in the operation functions assigned to the R dial 303 and the F dial 304. As described above, the activation of the button myset from each of the C1, C2, and C3 modes is completely the same as the activation of the button myset from each of the base set values of P, A, S, and M and only the difference therebetween is whether the set content of the transition source is the base set values or MySet1 to 3.

Myset Set/Cancellation Process

Figure 21:
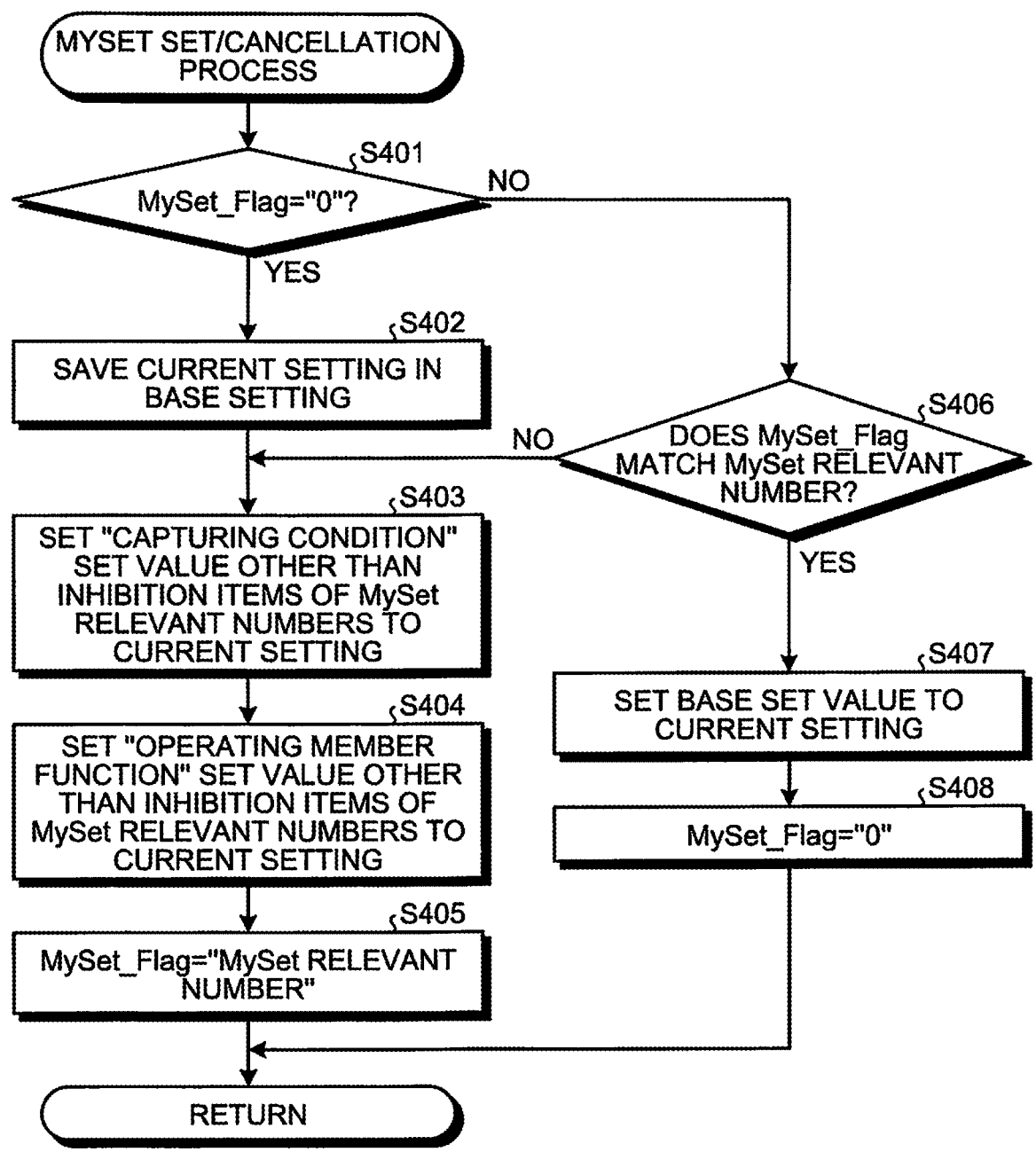
FIG. 21 is a flowchart illustrating an outline of a myset set/cancellation process illustrated in FIG. 15.

In the following, the myset set/cancellation process described at Step S210 illustrated in FIG. 15 will be described. FIG. 21 is a flowchart illustrating an outline of the myset set/cancellation process.

As illustrated in FIG. 21, first, the control unit 122 determines whether MySet_Flag recorded in the recording unit 116 is "0" (MySet_Flag="0"). Specifically, if MySet_Flag is "0", the control unit 122 determines that the imaging device 100 is in a non-myset state, whereas, if MySet_Flag is not "0", the imaging device 100 determines that the imaging device 100 is in a myset state. If it is determined by the control unit 122 that MySet_Flag recorded in the recording unit 116 is "0" (Yes at Step S401), the imaging device 100 proceeds to Step S402 that will be described later. In contrast, if it is determined by the control unit 122 that MySet_Flag recorded in the recording unit 116 is not "0" (No at Step S401), the imaging device 100 proceeds to Step S406 that will be described later.

At Step S402, the setting unit 42 saves the current setting of the operation function assigned to each of the operation members to the base setting of the setting information recorded in the setting information recording unit 32.

Subsequently, the setting unit 42 sets the set value of "capturing condition" other than the inhibition items of the MySet relevant numbers to the current setting (Step S403) and sets the set value of "operation member function" other than the inhibition items of the MySet relevant numbers to the current setting (Step S404). A description of MySet registration of "capturing condition" has been omitted; however, by using a menu (not illustrated), set conditions, such as an optical measurement mode, a WB mode, an AF mode, and an image quality mode, that are set at the time of image capturing may be registered in MySet1 to MySet4 and a registration inhibition may be specified. The content of the current setting indicated by Step S402 also includes this.

Figure 22:
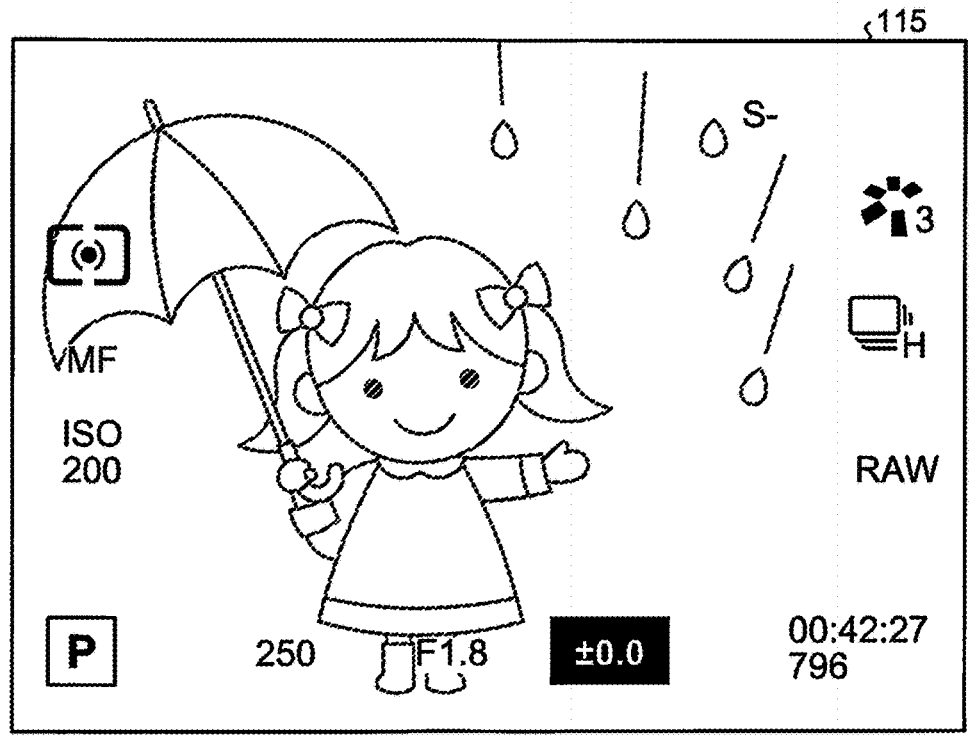
FIG. 22 is a diagram schematically illustrating an example of an image displayed by the imaging device according to the second embodiment.
Figure 23:
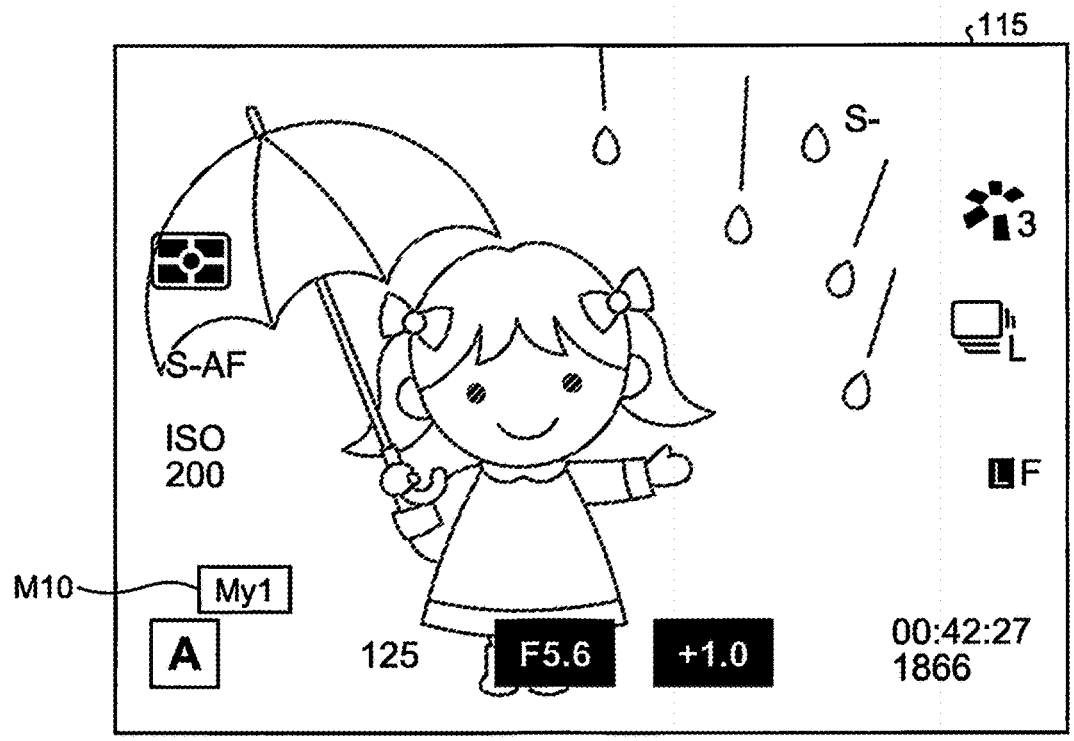
FIG. 23 is a diagram schematically illustrating an example of an image displayed by the imaging device according to the second embodiment.

Thereafter, the switching unit 43 switches MySet_Flag to the MySet relevant number (MySet_Flag="MySet relevant number") (Step S405). In this case, as illustrated in FIG. 22 and FIG. 23, the display controller 122a causes the first display unit 115 to display information M10 related to the MySet relevant number (FIG. 22 to FIG. 23). After the process at Step S405, the imaging device 100 returns to the subroutine illustrated in FIG. 15.

At Step S406, the control unit 122 determines whether MySet_Flag matches the MySet relevant number designated by the MySet operation member. If it is determined by the control unit 122 that MySet_Flag matches the MySet relevant number (Yes at Step S406), the imaging device 100 proceeds to Step S407 that will be described later. In contrast, if it is determined by the control unit 122 that MySet_Flag does not match the MySet relevant number (No at Step S406), the imaging device 100 proceeds to Step S403 that will be described later.

At Step S407, the return unit 44 sets the base set value recorded in the setting information recording unit 32 to the current setting of the operation function assigned to each of the operation members.

Subsequently, the return unit 44 sets MySet_Flag "0" (MySet_Flag="0") (Step S408). After the process at Step S408, the imaging device 100 returns to the subroutine illustrated in FIG. 15.

According to the second embodiment of the present disclosure described above, even when setting has been performed by assigning an arbitrary operation function to each of the plurality of operating units, it is possible to immediately switch to the setting that has been assigned to the button MySet and it is possible to reliably return to the original state and return to the operation function that was set before the change; therefore, it is possible to reliably return to the original state.

Furthermore, according to the second embodiment of the present disclosure described above, because the switching unit 43 automatically sets the operation member of the operating unit 117 that is inhibited at the time of activation of the button MySet and manages the setting, a user does not need to consider the item of each of the operation functions and may easily perform the setting by freely assigning the operation functions.

Furthermore, according to the second embodiment of the present disclosure described above, in response to the operation performed by the user, user's favorite capturing conditions and operation functions may be generated and registered, as a plurality of MySet functions by the generating unit 41; the plurality of MySet functions may be immediately read by the plurality of MySet buttons; and it is possible to reliably and immediately return to the original state.

Furthermore, according to the second embodiment of the present disclosure described above, due to MySet transition, it is possible to reliably prevent malfunction of the imaging device 100.

Figure 24:
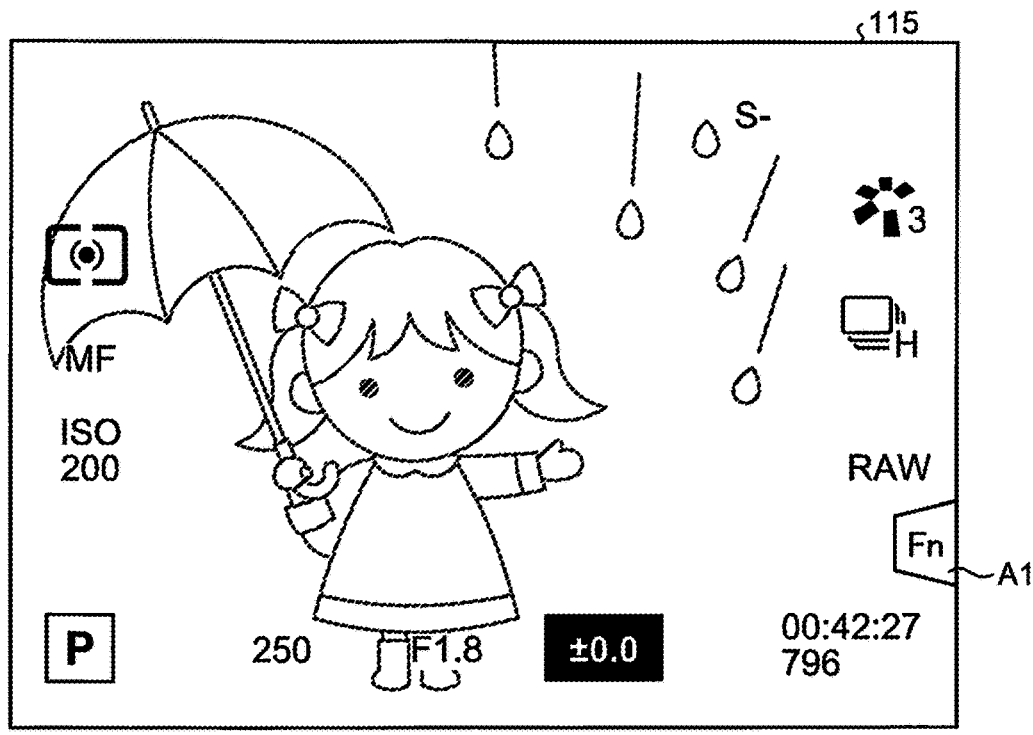
FIG. 24 is a diagram schematically illustrating an example of an icon according to a first modification of the second embodiment.
Figure 25:
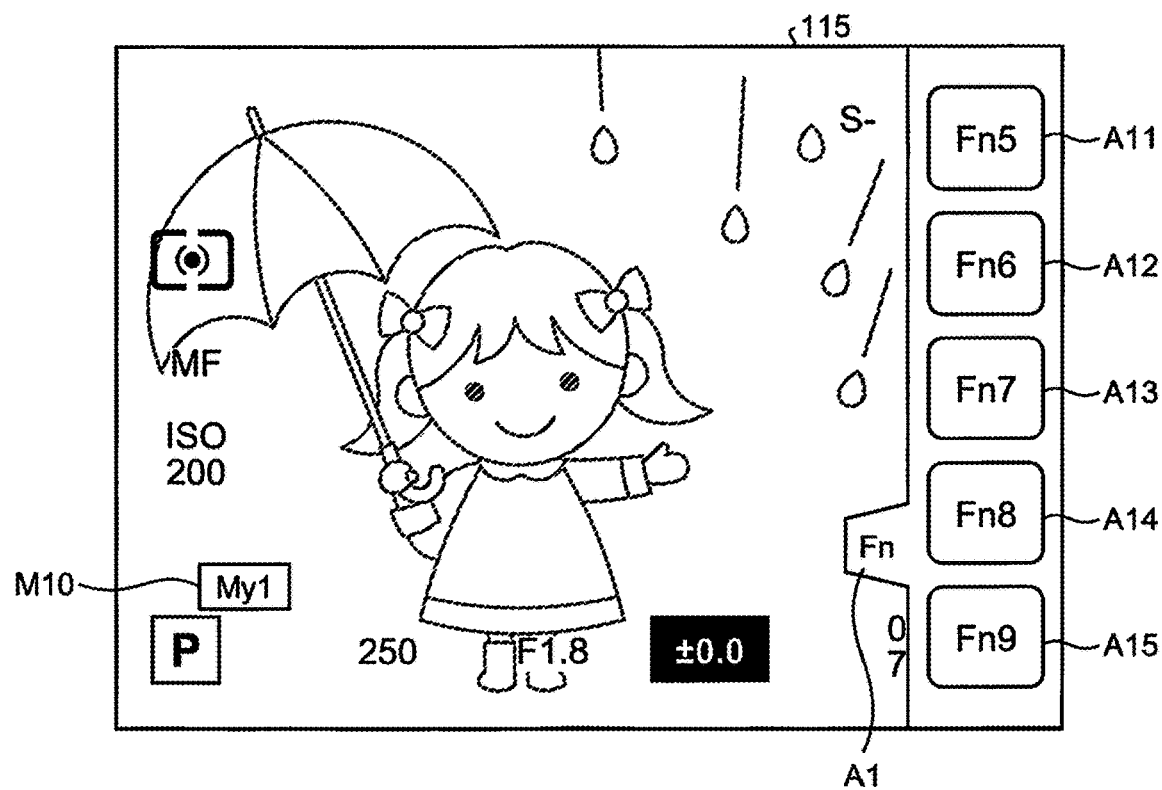
FIG. 25 is a diagram schematically illustrating an example of an icon according to the first modification of the second embodiment.

Furthermore, according to the second embodiment of the present disclosure described above, the switching unit 43 switches and assigns the operation functions to each of the plurality of operation members; however, the embodiment is not limited to this. For example, the operation functions may also be assigned to each of the plurality of icons displayed by the first display unit 115. Specifically, as illustrated in FIG. 24, the operation functions of an icon A11 to an icon A15 that are virtual buttons located in the tab in the icon A1 are switched. In this case, the switching unit 43 inhibits a change in the operation function assigned to the myset button function included in an icon A11 to an icon A15. Specifically, the switching unit 43 inhibits the read function of the myset information assigned to the icon A1 from being changed to the operation function registered in the myset information. Consequently, a user may immediately change to an arbitrary operation function and a change in the operation function of the virtual button assigned to the myset button function from among the icon A11 to the icon A15 is inhibited. Thus, even when the operation functions of the icon A11 to the icon A15 have been changed, the user may operate the imaging device 100 without hesitation in the operation.

Figure 26:
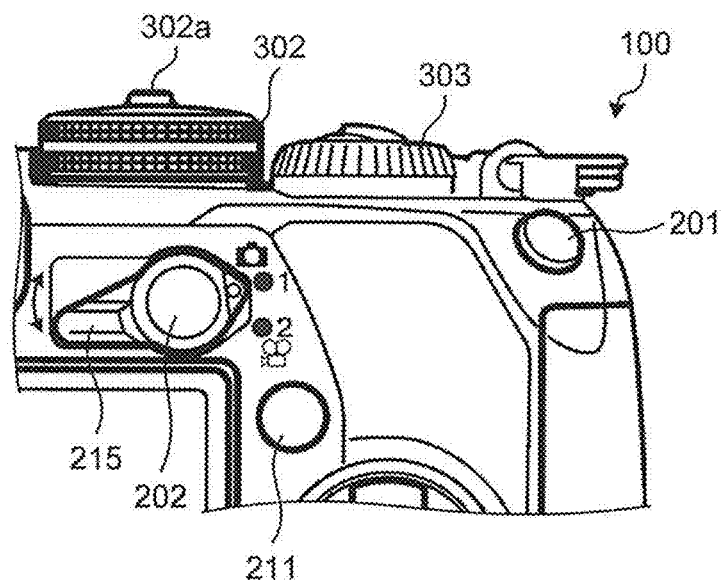
FIG. 26 is a diagram schematically illustrating switching of myset performed by using an Fn lever according to a second modification of the second embodiment.
Figure 27:
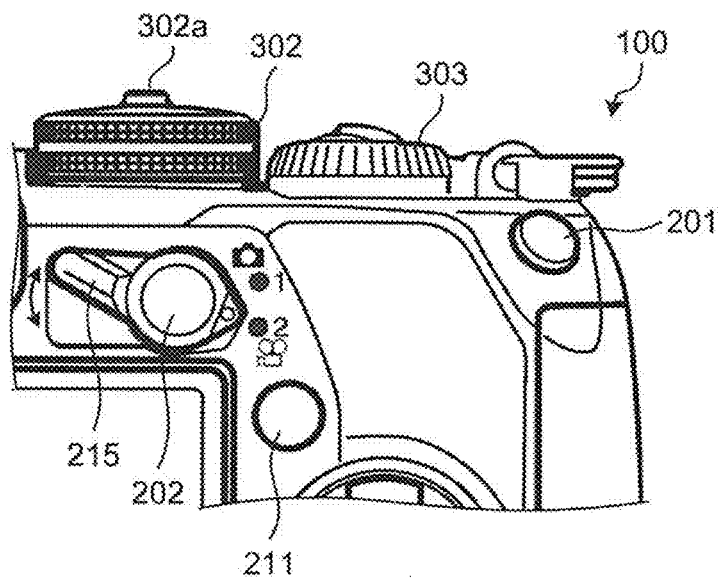
FIG. 27 is a diagram schematically illustrating switching of myset performed by using the Fn lever according to the second modification of the second embodiment.

Furthermore, according to the second embodiment of the present disclosure described above, the operation members of myset have been described by using the buttons; however, the embodiment is not limited to this. The operation function of reading myset may also be set in the Fn lever 215. Specifically, as illustrated in FIG. 26 and FIG. 27, in a case in which the imaging device 100 is set in the C1 mode, when the Fn lever 215 has been switched (FIG. 26 to FIG. 27), the switching unit 43 switches from the operation content, in which priority is given to the setting related to a still image mode, to the operation content, in which priority is given to the setting related to a moving image mode. Consequently, it is possible to immediately switch to myset that is used for moving image and this makes it possible to reliably return to a still image capturing state when the Fn lever 215 is returned to the original position. Thus, a plurality of operation functions may be selectively assigned to the Fn lever 215.

Other Embodiments

Various inventions may be made by appropriately combining a plurality of components disclosed in the first and the second embodiments of the present disclosure described above. For example, some of the components may be deleted from all of the components described in the first and the second embodiments of the present disclosure described above. Furthermore, the components described in the first and the second embodiments of the present disclosure described above may also appropriately be combined.

Furthermore, in the first and the second embodiments of the present disclosure described above, the "components" described above may be read as "means", "circuits", or the like. For example, a control unit may be read as a control means or a control circuit.

Furthermore, a program to be executed by the instrument according to first and the second embodiments of the present disclosure described above is provided by being recorded in a computer readable recording medium, such as a CD-ROM, flexible disk (FD), a CD-R, a digital versatile disk (DVD), a USB medium, or a flash memory, as file data in the form that may be installed or that may be executed.

Furthermore, the program to be executed by the instrument according to first and the second embodiments of the present disclosure described above may also be configured such that the program is stored in a computer connected to a network, such as the Internet, and is provided by being downloaded via a network. Furthermore, the program to be executed by the instrument or the imaging device according to first and the second embodiments of the present disclosure described above may also be configured such that the program is provided or distributed via a network, such as the Internet.

Furthermore, in a description of the flowcharts in the application, the relationship between before and after the processes performed at each step is stated by using "first", "then", "subsequently", and the like; however, the order of the processes needed to implement the present invention is not uniquely determined by the descriptions above. Specifically, the order of the processes in the flowcharts described in the application may also be changed as long as processes do not conflict with each other.

In the above, embodiments of the present application have been described in detail based on the drawings; however the embodiments are described only by way of an example. In addition to the embodiments described in the present disclosure, the present disclosure may be implemented in a mode in which various modifications and changes are made in accordance with the knowledge of those skilled in the art.

In this way, the present disclosure may include various embodiments that are not described herein, and various design changes or the like may be made within the scope not departing from the technical concept specified herein.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An instrument comprising
a processor comprising hardware, the processor being configured to execute:
generating pieces of setting information for assigning operation functions to respective operating units configured to be operated by a user;
assigning the operation functions to the respective operating units based on first one of the pieces of setting information;
setting one of the operating units as a setting operating unit to which an operation function for switching the first one of the pieces of setting information to second one of the pieces of the setting information assigned to the setting operating unit is assigned;
changing, upon a first operation of the setting operating unit, the operation functions of the operating units based on the second one of the setting information and inhibiting a change in the operation function assigned to the setting operating unit; and
returning, upon a second operation of the setting operating unit after the first operation of the setting operating unit, the operation functions of the operating units to the operation functions assigned before the first operation of the setting operating unit.

2. The instrument according to claim 1, wherein the processor executes, upon the first operation of the setting operating unit in a case where the setting information that is different from the setting information assigned to the setting operating unit is assigned to one of the operating units before the first operation of the setting operation unit, inhibiting a change in the operation function of said one of the operating units to which the setting information that is different from the setting information assigned to the setting operating unit is assigned.

3. The instrument according to claim 1, wherein the processor executes, in a case where the setting information that is different from the setting information assigned to the setting operating unit is assigned to one of the operating units after the first operation of the setting operation unit, inhibiting a change in the operation function of said one of the operating units to which the setting information that is different from the setting information assigned to the setting operating unit is assigned.

4. The instrument according to claim 1, further comprising a condition setting unit to which an operation function for setting a drive condition of the instrument has been assigned, wherein
The processor executes inhibiting a change in the operation function assigned to the condition setting unit when the setting operating unit is operated.

5. The instrument according to claim 1, further comprising a memory configured to record the pieces of setting information.

6. The instrument according to claim 1, further comprising:
a lens unit configured to form an object image; and
an image sensor configured to receive the object image formed by the lens unit and generate image data, wherein
the operation functions include at least a function for changing a state of the lens unit.

7. The instrument according to claim 1, wherein the instrument is one of an imaging device, an endoscope, a mobile phone, and a microscope.

8. The instrument according to claim 1, wherein each of the operating units is one of a dial, a button, and a lever switch.

9. The instrument according to claim 1, further comprising:
a display configured to display an image; and
a display controller configured to control the display to display icons associated with the operating units, wherein the processor executes setting the operation function to each of the icons and assigning, to at least one of the icons, an operation function for switching to at least one of the pieces of setting information assigned to said at least one of the icons.

10. A control method executed by an instrument that includes operating units configured to be operated by a user, the control method comprising:

generating pieces of setting information for assigning operation functions to respective operating units configured to be operated by a user;

assigning the operation functions to the respective operating units based on first one of the pieces of setting information;

setting one of the operating units as a setting operating unit to which an operation function for switching the first one of the pieces of setting information to second one of the pieces of the setting information assigned to the setting operating unit is assigned;

changing, upon a first operation of the setting operating unit, the operation functions of the operating units based on the second one of the setting information and inhibiting a change in the operation function assigned to the setting operating unit; and returning, upon a second operation of the setting operating unit after the first operation of the setting operating unit, the operation functions of the operating units to the operation functions assigned before the first operation of the setting operating unit.

11. A non-transitory computer readable recording medium on which an executable program is recorded, the program instructing a processor of an instrument including operating units configured to be operated by a user to execute:

generating pieces of setting information for assigning operation functions to respective operating units configured to be operated by a user;

assigning the operation functions to the respective operating units based on first one of the pieces of setting information;

setting one of the operating units as a setting operating unit to which an operation function for switching the first one of the pieces of setting information to second one of the pieces of the setting information assigned to the setting operating unit is assigned;

changing, upon a first operation of the setting operating unit, the operation functions of the operating units based on the second one of the setting information and inhibiting a change in the operation function assigned to the setting operating unit; and returning, upon a second operation of the setting operating unit after the first operation of the setting operating unit, the operation functions of the operating units to the operation functions assigned before the first operation of the setting operating unit.

* * * * *